United States Patent
Czerwinski et al.

(10) Patent No.: US 11,245,777 B1
(45) Date of Patent: Feb. 8, 2022

(54) MULTI-APPLICATION INTERACTIVE SUPPORT AND COMMUNICATION INTERFACE

(71) Applicant: Groupon, Inc., Chicago, IL (US)

(72) Inventors: Bartosz Czerwinski, Chicago, IL (US); Filip Krawiec, Sosnowiec (PL); Miroslaw Forystek, Katowice (PL)

(73) Assignee: GROUPON, INC., Chicago, IL (US)

( * ) Notice: Subject to any disclaimer, the term of this patent is extended or adjusted under 35 U.S.C. 154(b) by 136 days.

(21) Appl. No.: 16/566,684

(22) Filed: Sep. 10, 2019

Related U.S. Application Data

(60) Provisional application No. 62/729,745, filed on Sep. 11, 2018.

(51) Int. Cl.
| | |
|---|---|
| *G06F 3/0482* | (2013.01) |
| *H04L 29/08* | (2006.01) |
| *H04L 12/24* | (2006.01) |
| *H04M 3/51* | (2006.01) |

(52) U.S. Cl.
CPC ............ *H04L 67/36* (2013.01); *G06F 3/0482* (2013.01); *H04L 41/5061* (2013.01); *H04L 41/5064* (2013.01); *H04L 41/5074* (2013.01); *H04L 67/306* (2013.01); *H04M 3/5191* (2013.01)

(58) Field of Classification Search
CPC . H04M 3/5191; G06Q 10/00; H04L 41/5061; H04L 41/5074; H04L 41/5064; H04L 67/36; H04L 67/306; G06F 3/0482
See application file for complete search history.

(56) References Cited

U.S. PATENT DOCUMENTS

| | | | |
|---|---|---|---|
| 8,375,329 B2 * | 2/2013 | Drayton | G06F 3/0482 715/834 |
| 2008/0147651 A1 * | 6/2008 | Bhogal | G06F 40/274 |
| 2009/0282106 A1 * | 11/2009 | Jaffer | H04M 3/5191 709/206 |
| 2015/0178371 A1 * | 6/2015 | Seth | G06F 16/3329 707/748 |
| 2017/0277667 A1 * | 9/2017 | Weston | G06F 3/0484 |
| 2019/0146647 A1 * | 5/2019 | Ramchandran | G06Q 30/016 715/758 |

* cited by examiner

*Primary Examiner* — Daniel Samwel
(74) *Attorney, Agent, or Firm* — Alston & Bird LLP

(57) ABSTRACT

Provided herein are systems, methods and computer program product for operating a multi-application interactive support and communication interface of a multi-application interactive support and communication system. In providing a multi-application interactive support and communication interface, the system can be configured to receive a dynamic support request, the dynamic support request comprising a support user account identifier and support user issue data. The system is configured to output, to a computer interface, the multi-application interactive support and communication interface comprising a plurality of support user data elements and a multi-sector graphical interface element, wherein the multi-sector graphical interface element is configured to facilitate operator interaction with multiple service applications. In another example embodiment, the system is further configured to update the plurality of support user data elements of the multi-application interactive support and communication interface based on the support user account identifier and the support user issue data.

25 Claims, 24 Drawing Sheets

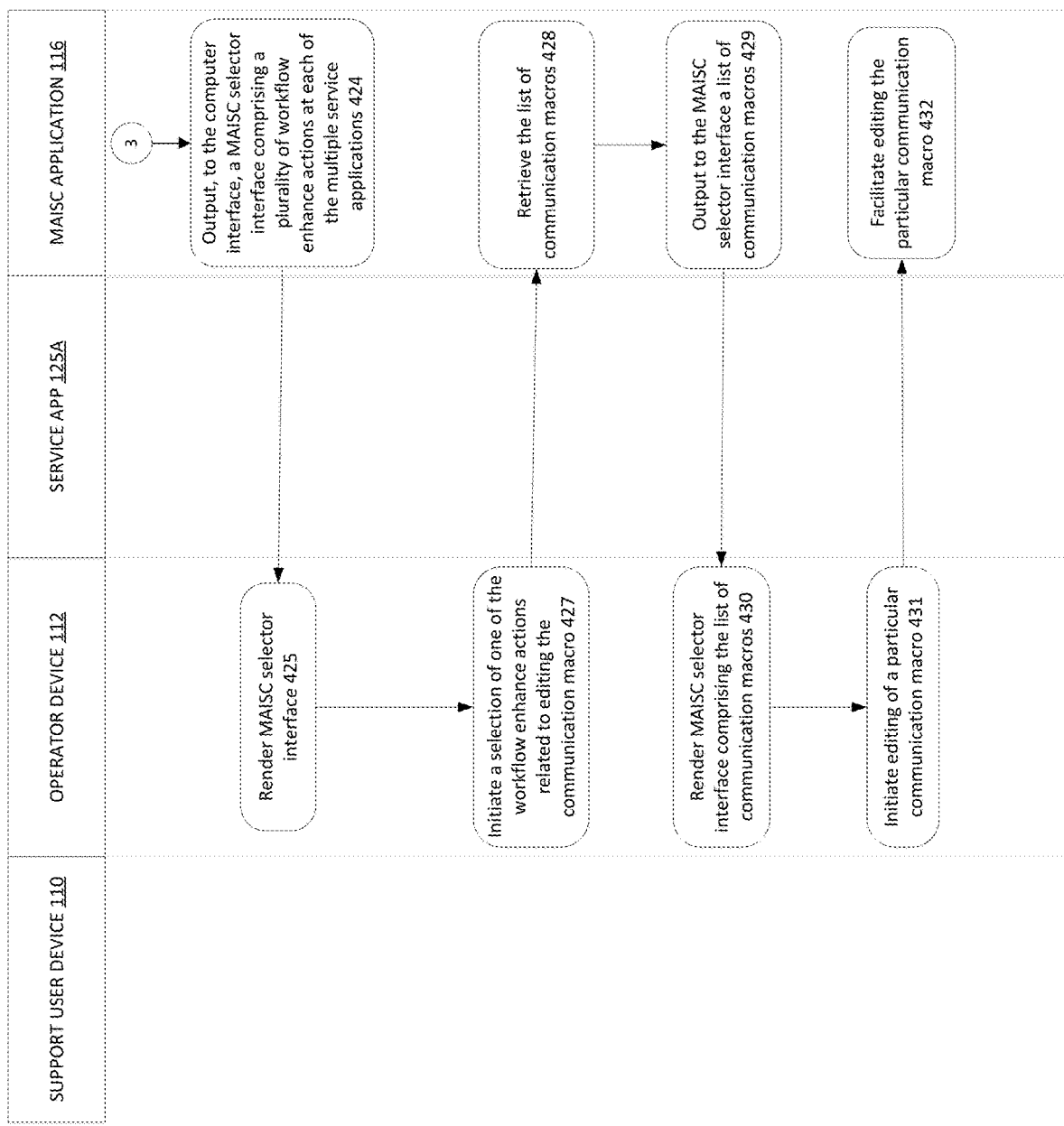

FIG. 7B

MULTI-APPLICATION INTERACTIVE SUPPORT AND COMMUNICATION INTERFACE

CROSS REFERENCE TO RELATED APPLICATIONS

This application claims priority to U.S. Provisional Application No. 62/729,745, filed Sep. 11, 2018, the entire contents of which are incorporated herein by reference.

BACKGROUND

As computer system networks expand in size and technical complexity, users often find themselves in need of technical support systems and tools. Applicant has identified a number of deficiencies and problems associated with conventional technical support systems and tools. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for facilitating a multi-application interactive support and communication interface.

Example embodiments include an apparatus for operating a multi-application interactive support and communication interface of a multi-application interactive support and communication system, wherein the apparatus comprises at least one processor, and at least one memory having computer coded instructions therein, with the computer instructions configured to, when executed by the processor, cause the apparatus to receive a dynamic support request, the dynamic support request comprising a support user account identifier and support user issue data. The apparatus is further configured to output, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications. In another example embodiment, the apparatus is further configured to update the plurality of support user data elements of the multi-application interactive support and communication interface based on the support user contextual data.

Embodiments may also include a computer-implemented method for operating a multi-application interactive support and communication interface of a multi-application interactive support and communication system, the computer-implemented method comprising receiving a dynamic support request, the dynamic support request comprising a support user account identifier and support user issue data, and outputting, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications. In another example embodiment, the computer-implemented method further comprises updating the plurality of support user data elements of the multi-application interactive support and communication interface based on the support user account identifier and the support user issue data.

Embodiments also include a computer program product, stored on a computer readable medium, comprising instructions that when executed on one or more computers cause the one or more computers to perform operations comprising receiving a dynamic support request, the dynamic support request comprising a support user account identifier and support user issue data, and outputting, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications. In another example embodiment, the computer program product is further configured to update the plurality of support user data elements of the multi-application interactive support and communication interface based on the support user account identifier and the support user issue data.

BRIEF DESCRIPTION OF THE FIGURES

Figure 1:
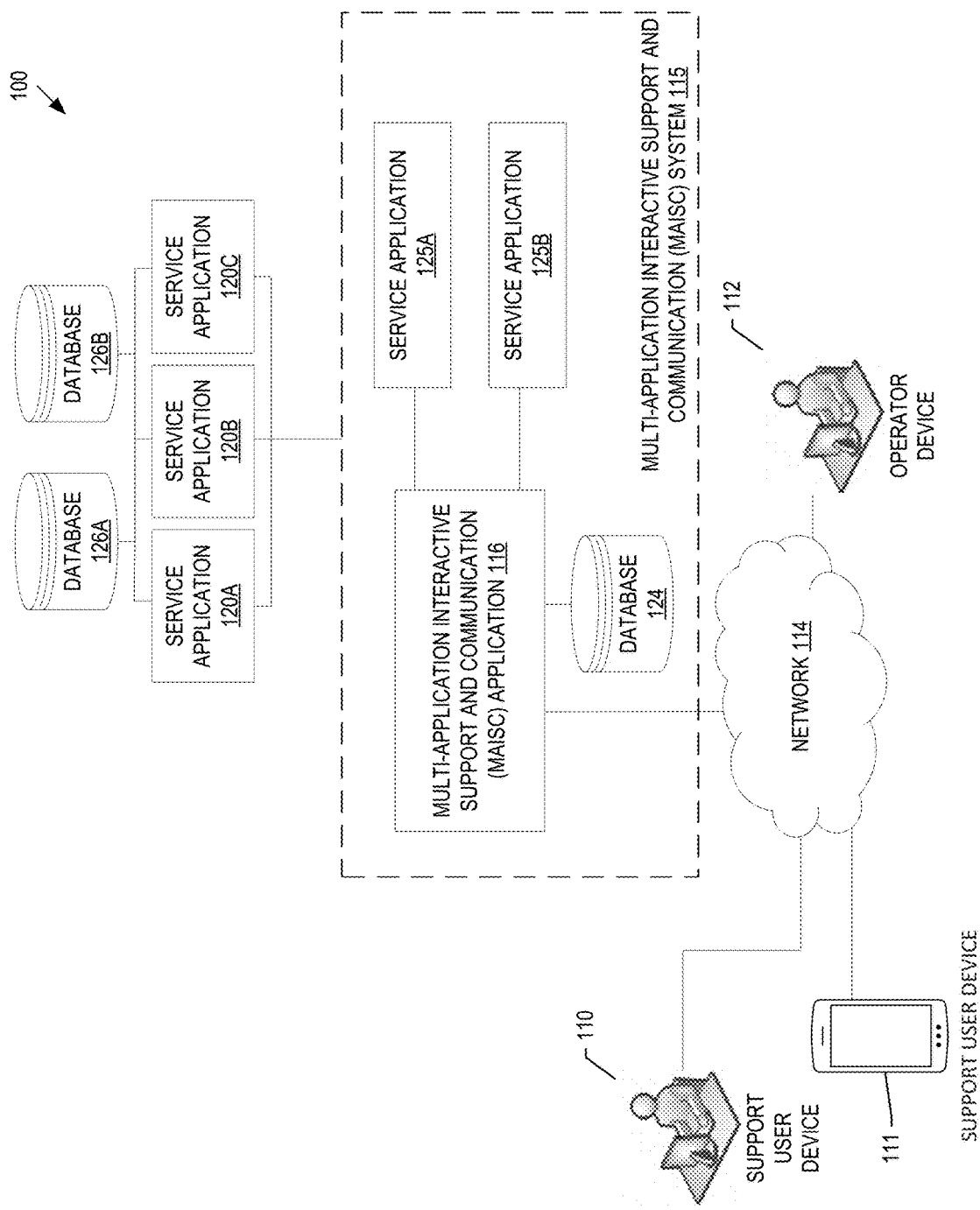
Figure 2:
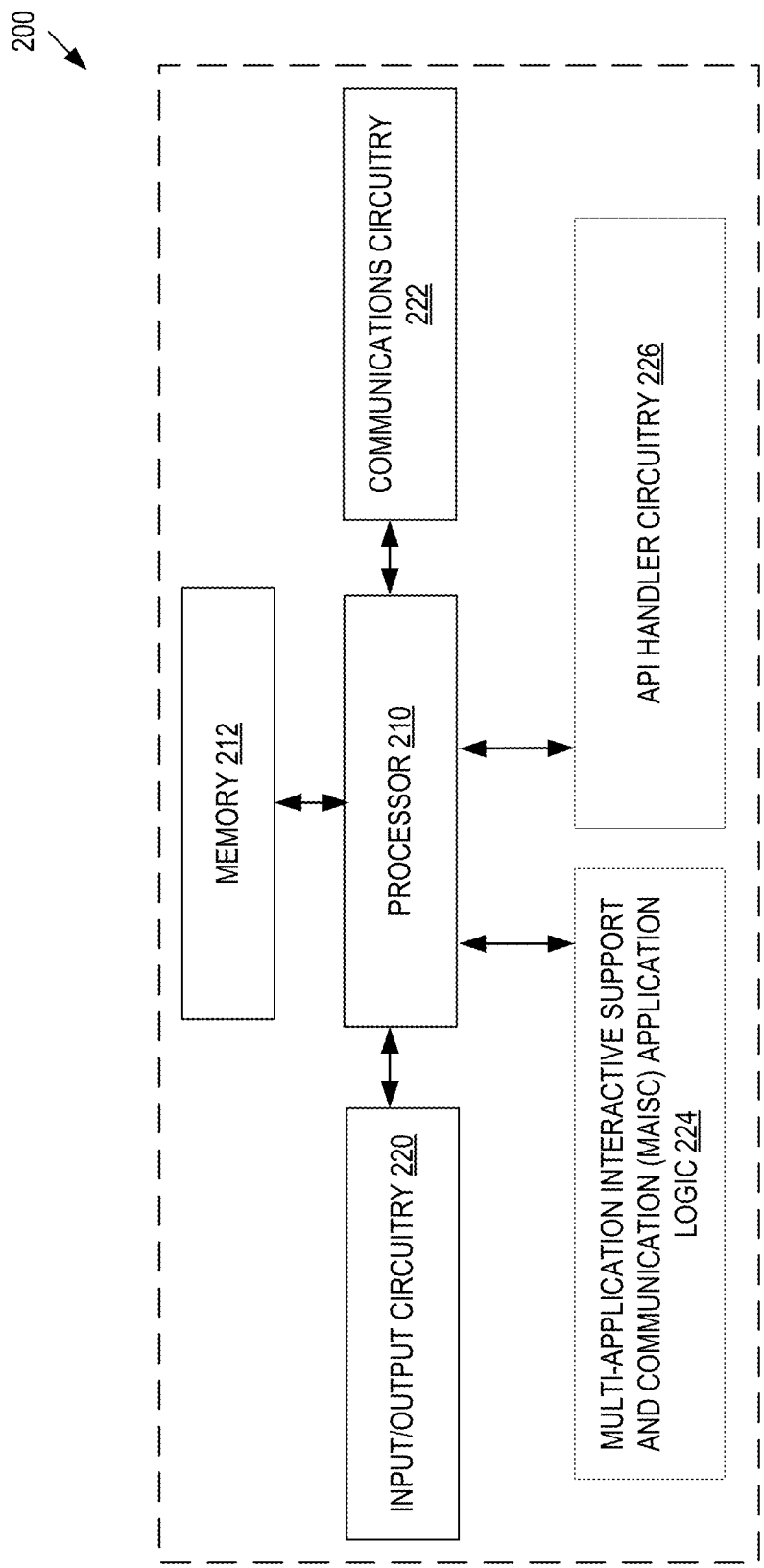
Figure 3:
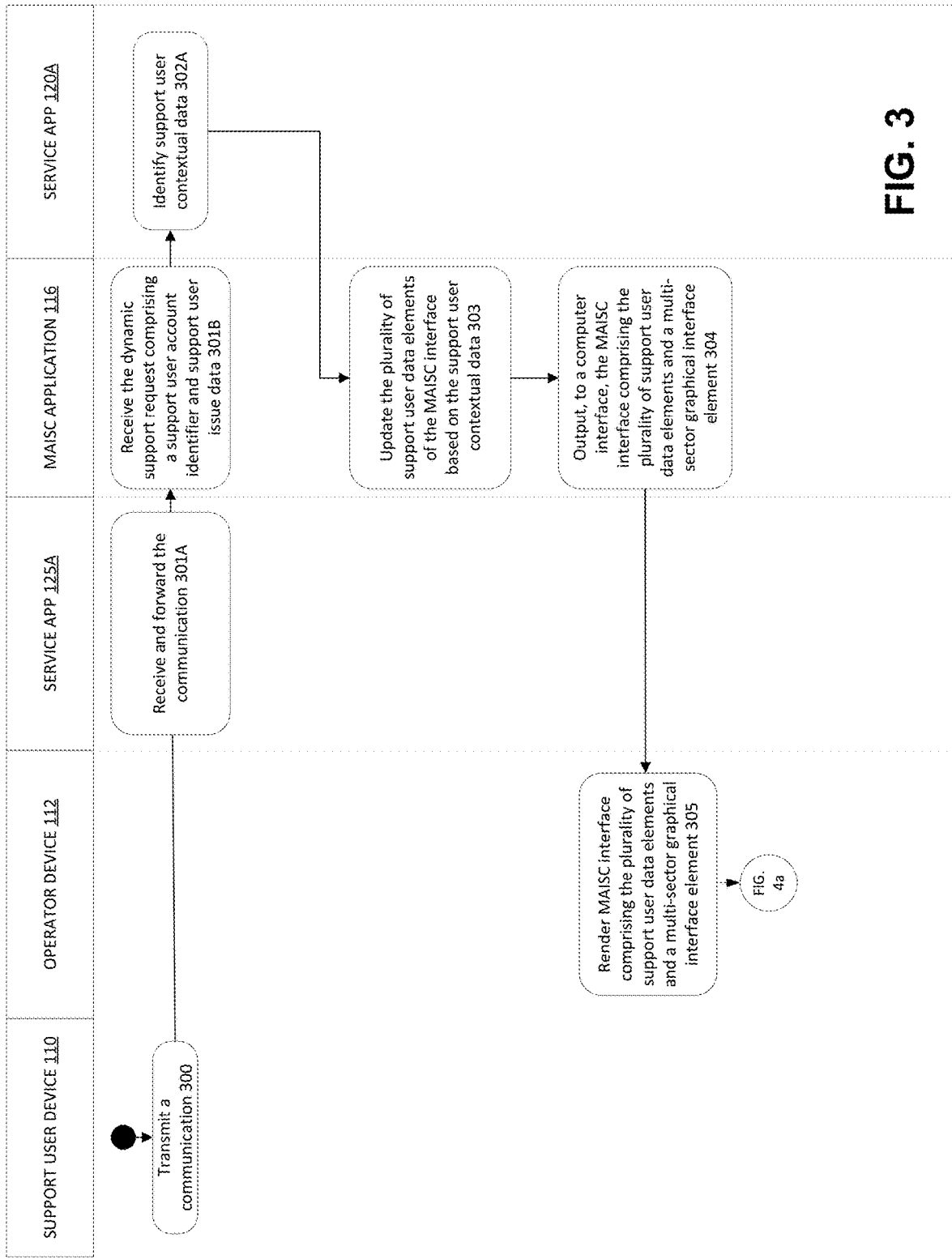
Figure 4A:
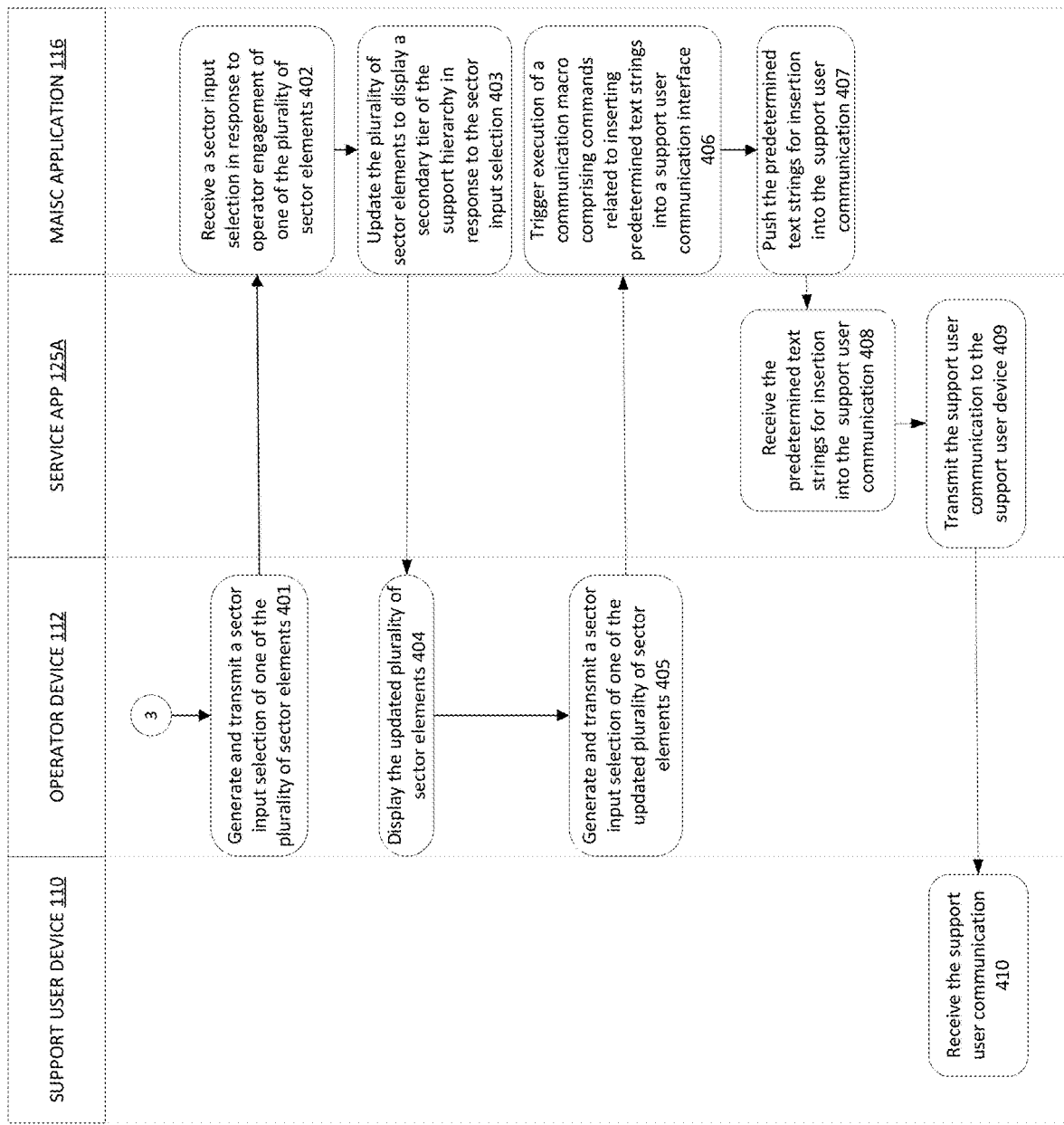
Figure 4B:
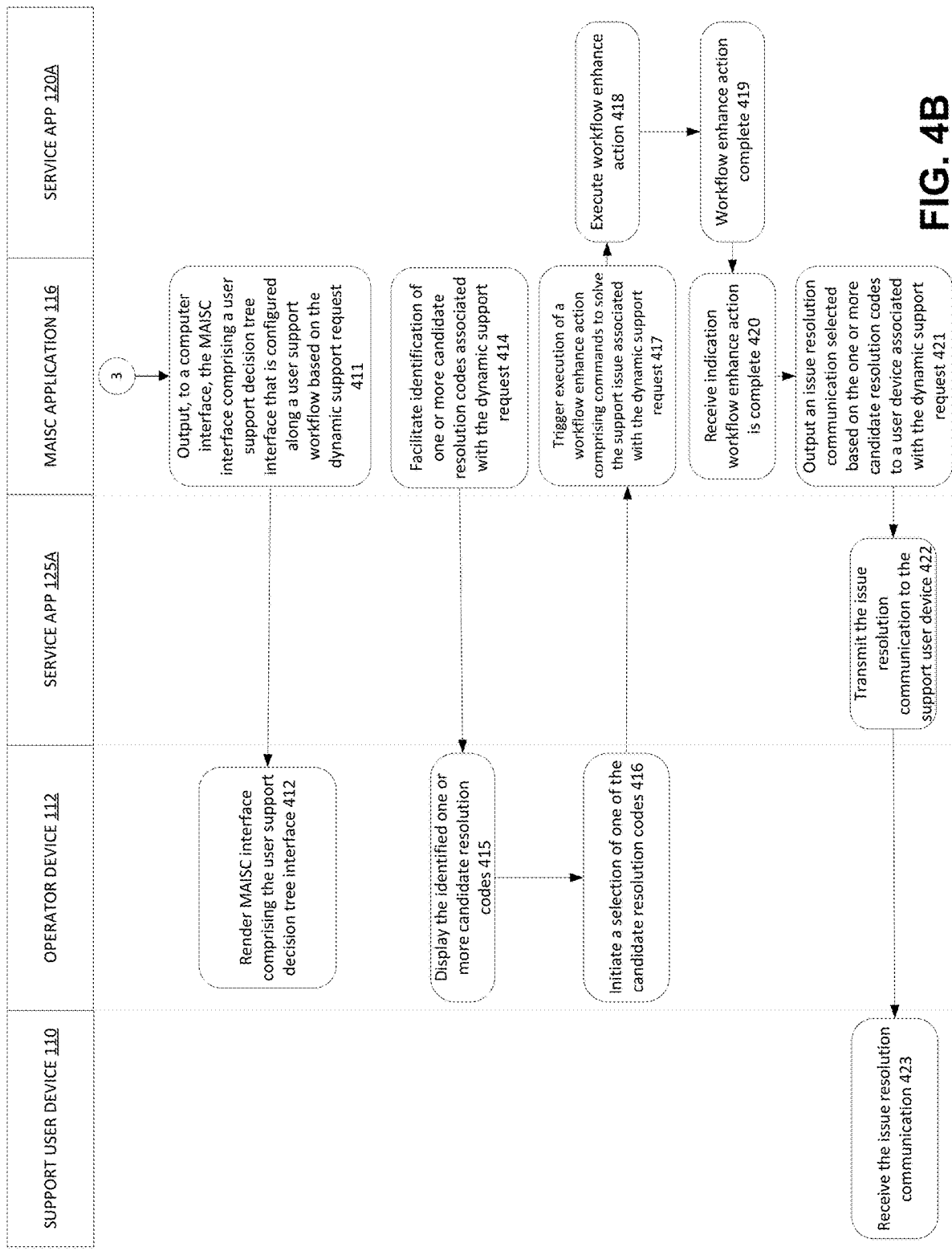
Figure 7A:
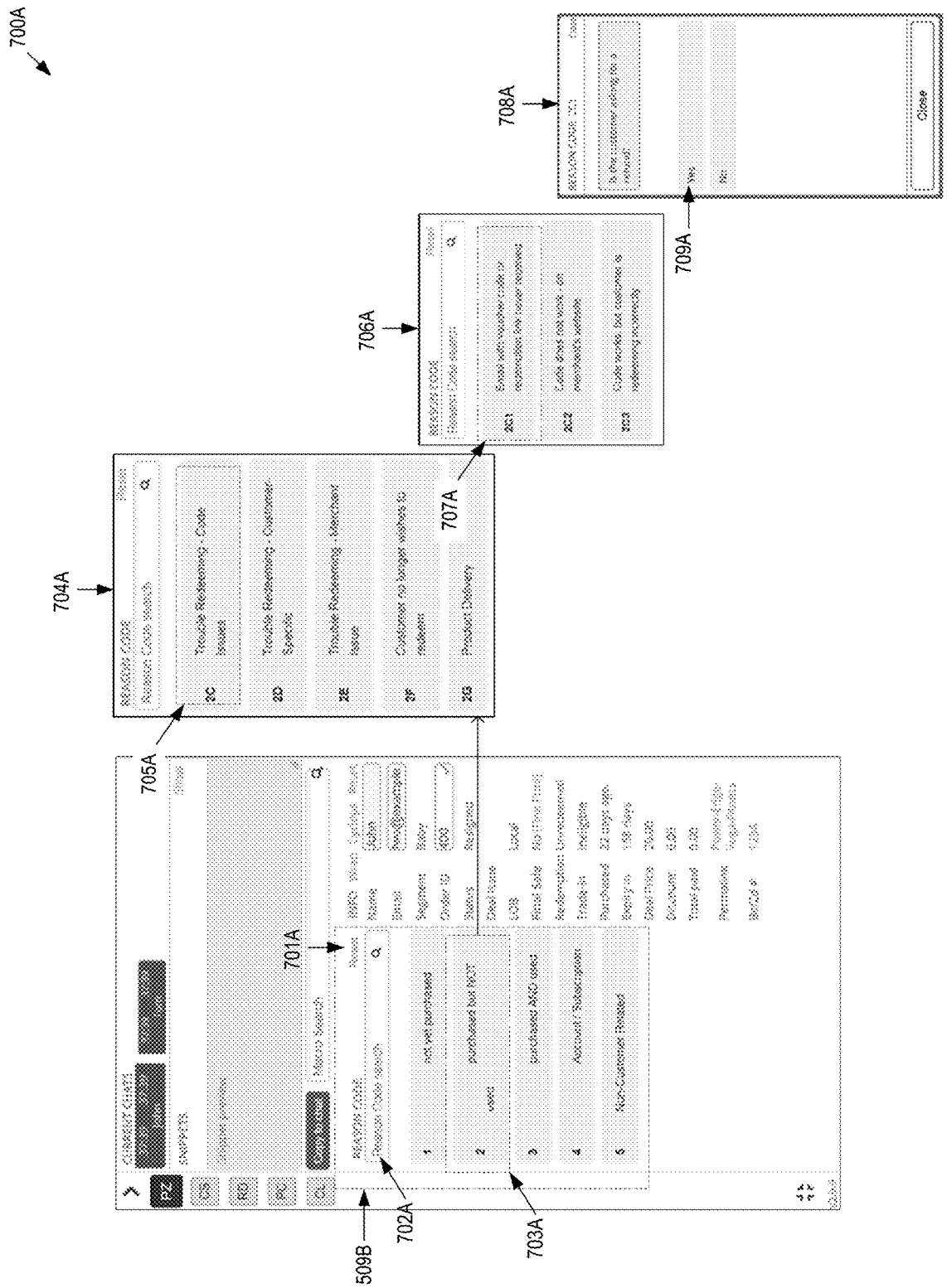
Figure 7C:
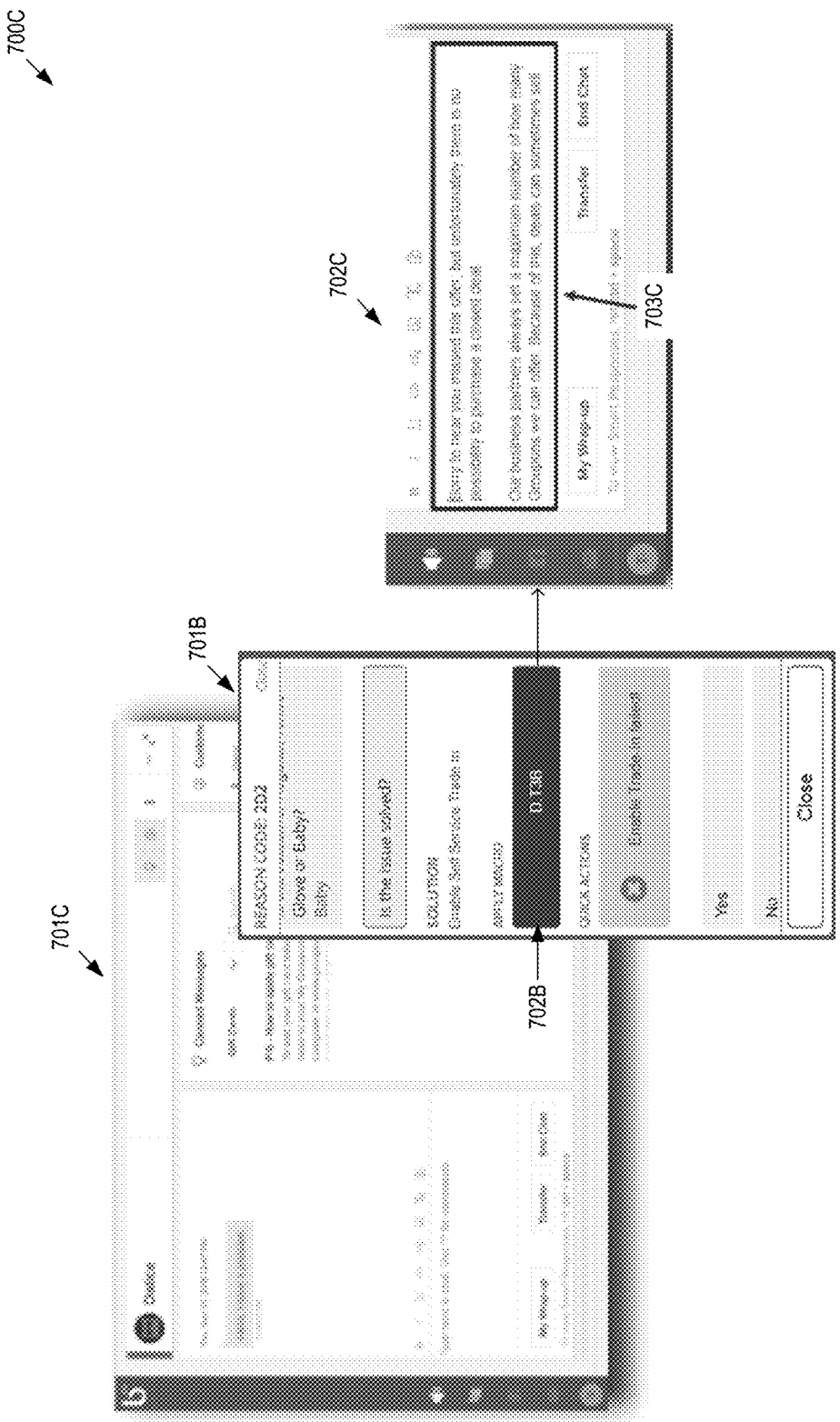
Figure 8A:
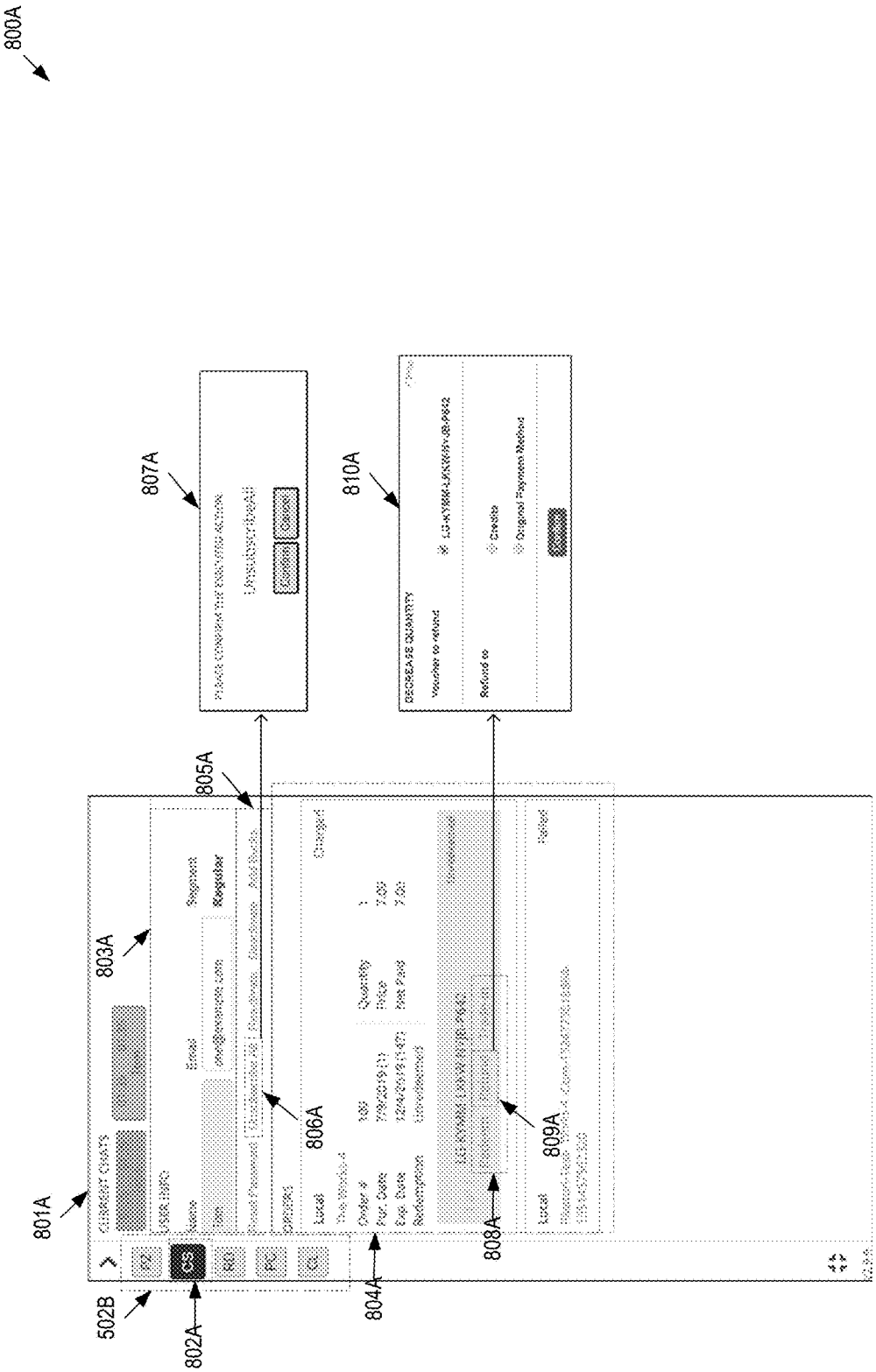
Figure 8B:
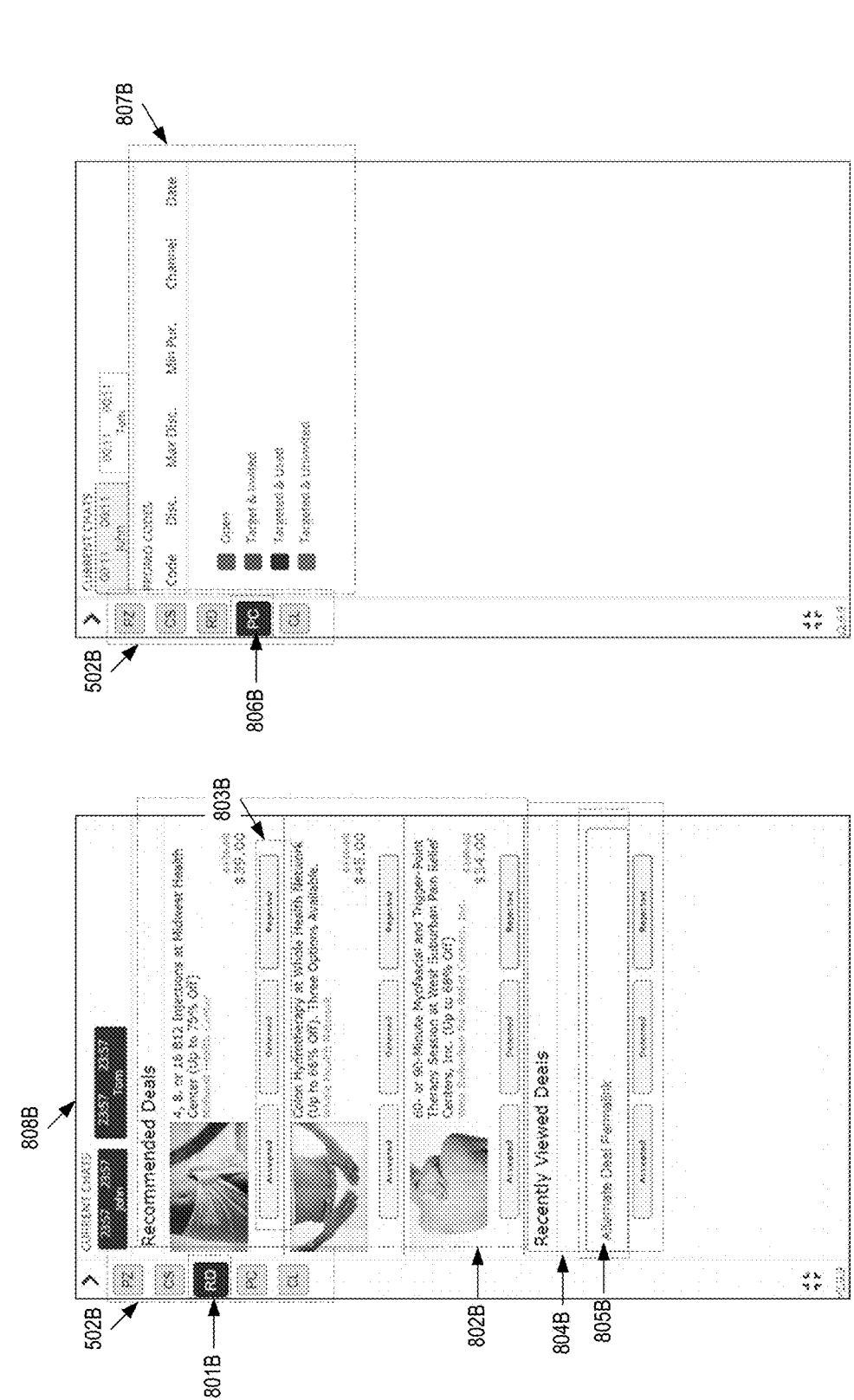
Figure 8C:
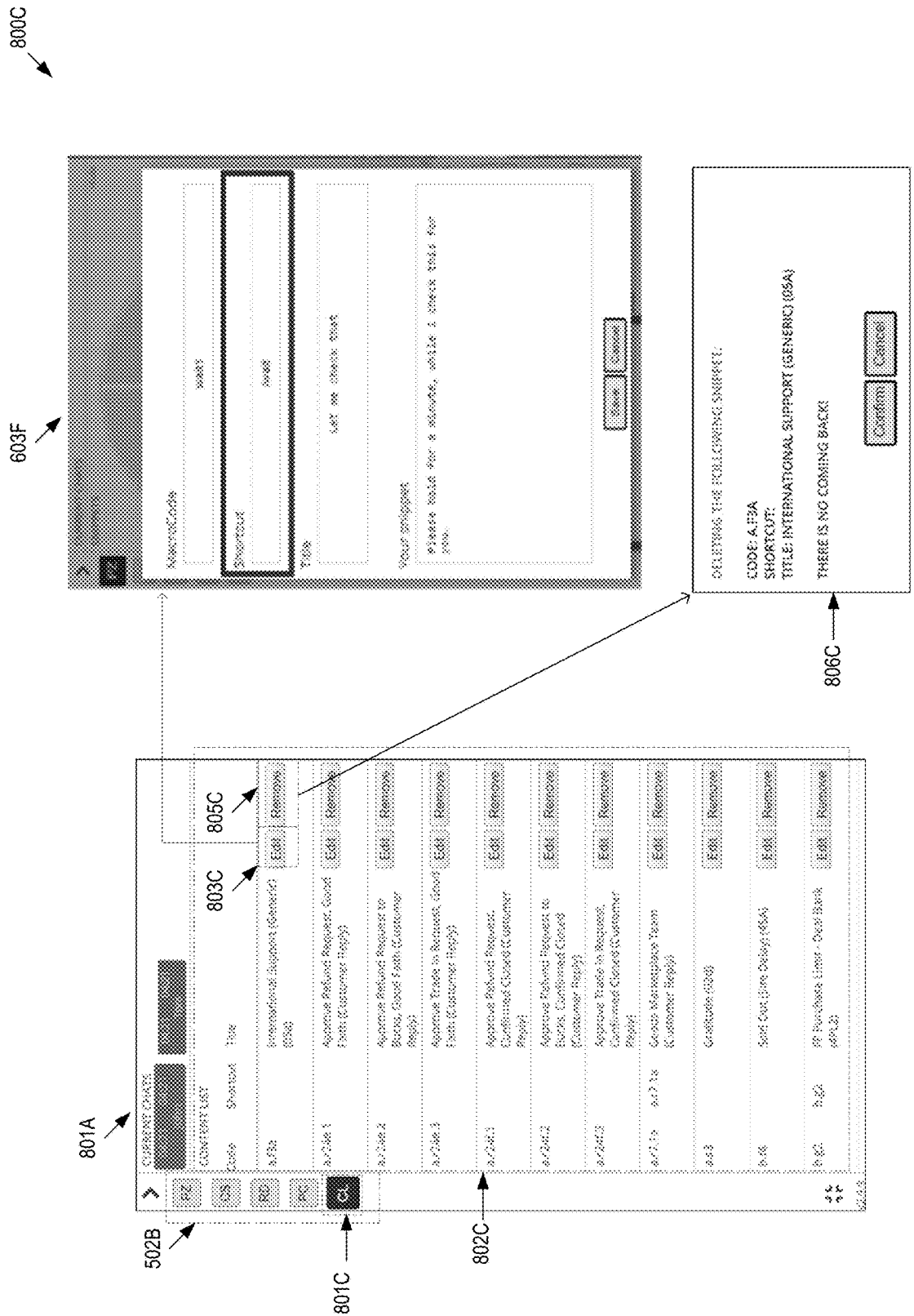
Figure 9:
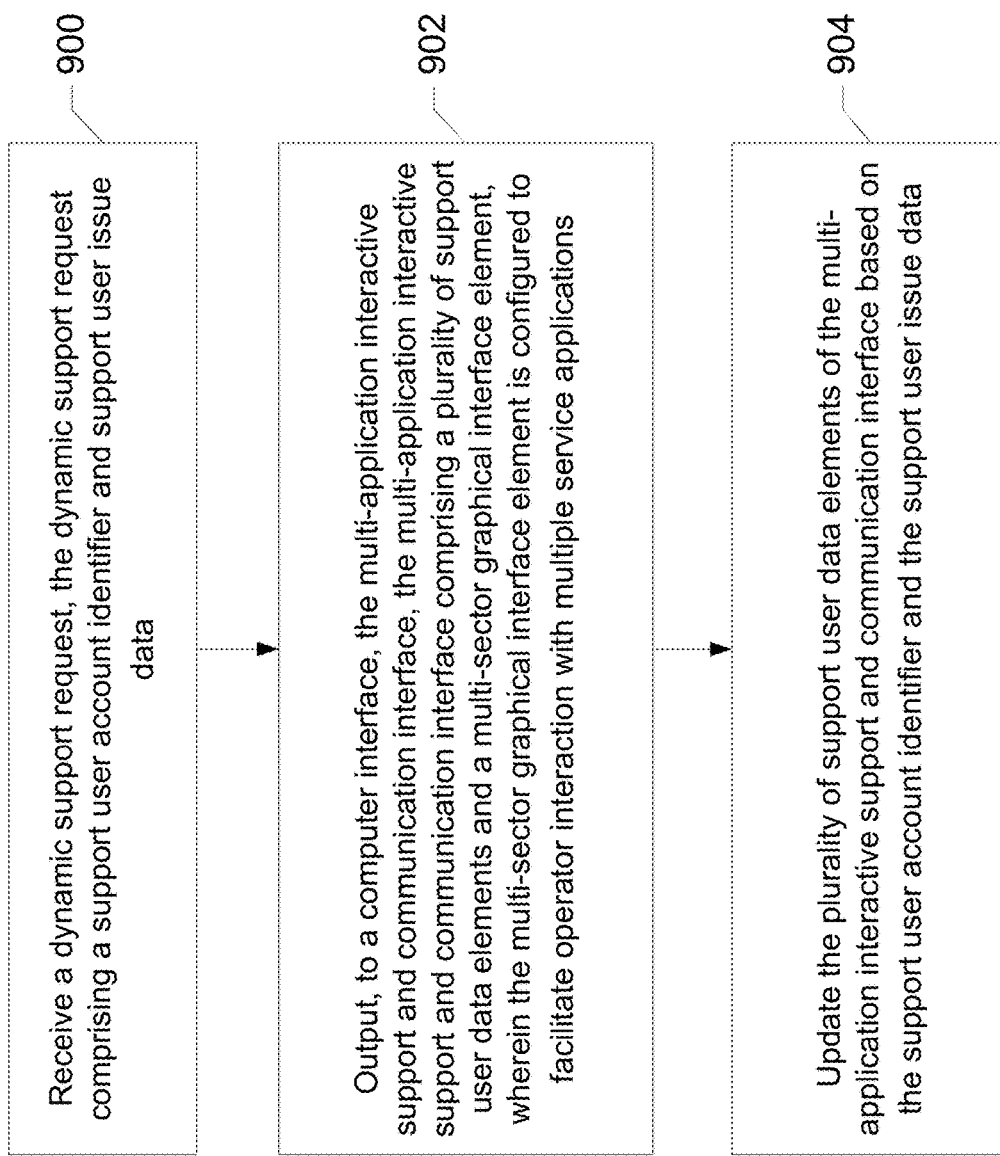

Having thus described embodiments of the invention in general terms, reference will now be made to the accompanying drawings, which are not necessarily drawn to scale, and wherein:

FIG. 1 illustrates an example multi-application interactive support and communication system configured in accordance with some embodiments discussed herein;

FIG. 2 illustrates a schematic block diagram of example circuitry configured for a client device, such as an operator device, and/or a multi-application interactive support and communication system, in accordance with some embodiments discussed herein;

FIG. 3 illustrates an example operation sequence diagram illustrating operations performed by devices of a user support system configured in accordance with some embodiments discussed herein;

FIG. 4A illustrates an example operation sequence diagram illustrating operations performed by devices of a user support system configured in accordance with some embodiments discussed herein;

FIG. 4B illustrates an example operation sequence diagram illustrating operations performed by devices of a user support system configured in accordance with some embodiments discussed herein;

FIG. 4C illustrates an example operation sequence diagram illustrating operations performed by devices of a user support system configured in accordance with some embodiments discussed herein;

FIGS. 5A, 5B, 5C, 5D, and 5E illustrate example multi-application interactive support and communication interfaces in accordance with some embodiments discussed herein;

FIGS. 6A, 6B, 6C, 6D, 6E, and 6F illustrate example multi-application interactive support and communication interfaces comprising a multi-sector graphical interface element of a multi-application interactive support and communication system structured in accordance with some embodiments discussed herein;

FIGS. 7A, 7B, and 7C illustrate example user support decision tree interfaces of a multi-application interactive support and communication system structured in accordance with some embodiments discussed herein;

FIGS. 8A, 8B, and 8C illustrate example multi-application interactive support and communication selector interfaces of a multi-application interactive support and communication system structured in accordance with some embodiments discussed herein; and FIG. 9 illustrates a flow diagram of example operations performed by the multi-application interactive support and communication system in accordance with some embodiments discussed herein.

DETAILED DESCRIPTION

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the term "multi-application interactive support and communication interface" refers to a virtual communication environment (e.g., a graphic user interface) that is configured to facilitate operator interaction with a multi-application interactive support and communication system (defined below). The multi-application interactive support and communication interface includes a plurality of support user data elements (defined below) and a multi-sector graphical interface element (defined below). In some embodiments, the multi-application interactive support and communication interface includes a user support decision tree interface (defined below). The multi-application interactive support and communication interface is configured to facilitate operator communication with one or more support users and a plurality of service applications via the multi-application interactive support and communication system.

The term "multi-application interactive support and communication system" refers to a communications software platform and associated hardware that is configured to support and maintain a plurality of multi-application interactive support and communication interfaces. The multi-application interactive support and communication system manages communications between support users, operators, and a variety of service applications. In various embodiments, the multi-application interactive support and communication system is configured to provide operators with real-time data from various service applications to assist the operator with user support decisions based on analytics and other data derived from such service applications. To this end, the multi-application interactive support and communication system receives a dynamic support request (defined below) from a support user device and facilitates identification, through operator engagement, of a resolution for the dynamic support request.

The term "multi-application interactive support and communication application" refers to a stand-alone or desktop application designed and written to leverage the operating system on the multi-application interactive support and communication system. Alternatively, the multi-application interactive support and communication application can be designed and written as a module or extension to function within another service application already present on the multi-application interactive support and communication system. For example, a Java™ Applet or Active X component designed to execute in a web browser such as Firefox™, Chrome™, or Internet Explorer™. The multi-application interactive support and communication application runs locally on the multi-application interactive support and communication system in order to execute functionality. The multi-application interactive support and communication application can retrieve a plurality of support user data elements in order to populate the plurality of multi-application interactive support and communication interfaces. The result is a multi-feature user interface, assembled by the multi-application interactive support and communication application, using resources from disparate third party service applications to populate the plurality of multi-application interactive support and communication interfaces.

The multi-application interactive support and communication application accepts user input from the plurality of multi-application interactive support and communication interfaces and relays that input to any of the service applications. This allows the multi-application interactive support and communication application to access third party service application resources or functionality.

The term "dynamic support request" refers to an electronic information package transmitted by a support user device to a multi-application interactive support and communication system and which is used, by the multi-application interactive support and communication system, to update a multi-application interactive support and communication interface. The dynamic support request comprises a support user account identifier (defined below) and support user issue data (defined below).

The term "support user account identifier" refers to a unique identifier that is used by the multi-application interactive support and communication system to identify a particular support user account and any data associated with such support user account (e.g., a support user account profile, support user device data, support user transaction history, support user service application history, etc.). For example, and without limitation, a support user account identifier may include a unique identifier, an internet protocol (IP) address, a media access control (MAC) address, a user identifier, and the like.

The term "support user issue data" refers to any data, metadata, records, error codes, problem descriptions, and the like that indicate a support issue associated with a support user account to the multi-application interactive support and communication system. Such support issues may include, without limitation, a selected support user account data request, a product or service return request, a product or service exchange request, a product or service cancellation request, an ordering assistance request, a shipping inquiry, an order tracking request, a refund request, a system error report, and the like.

The term "multi-sector graphical interface element" refers to a portion of the multi-application interactive support and communication interface that is configured to support operator interaction with a plurality of service applications. The multi-sector graphical interface element includes a plurality of sector elements that are configured into a support hierarchy based on the dynamic support request. Operator engagement of one of the plurality of sector elements causes the multi-application interactive support and communication system to receive a sector input selection and to update the plurality of sector elements to display a secondary tier of the support hierarchy. In this way, the multi-sector graphical interface element is configured to "drill down" into tiered command structures of a support hierarchy to identify and resolve user support issues. In one embodiment, a multi-sector graphical interface element is pie-shaped to resemble a pie-graph. In other embodiments, a multi-sector graphical interface element may take other multi-sector geometric shapes.

The term "plurality of support user data elements" refers to portions of the multi-application interactive support and communication interface that are configured to be updated by the multi-application interactive support and communication system in response to receipt of a dynamic support request. For example, in various embodiments, the plurality of support user data elements include data fields that are configured to inform an operator of information and details associated with a support user account identifier, such as, but not limited to, transaction data, account data, profile data, preference data, or any other data that may serve to identify a support user, a particular transaction, a particular support user issue, and the like.

The term "support user context data" refers to any data, metadata, records, support user account identifier(s), support user account(s), support user issue data, support user transaction data, support user account data, profile data, support user preference data, support user settings data, or any other data that may serve to identify a support user, a particular transaction, a particular support user issue. The support user context data is accessed by the multi-application interactive support and communication system to update and/or render the plurality of support user data elements within the multi-application interactive support and communication interface. In one embodiment, the support user context data is identified by the multi-application interactive support and communication system using one or more of a support user account identifier and support user issue data drawn from a dynamic support request.

The term "operator" refers to a user support representative, customer support representative, a customer service advisor, or the like that engages or otherwise interacts with the multi-application interactive support and communication system through the multi-application interactive support and communication interface to identify and resolve user support issues.

The term "support hierarchy" refers to a support operations structure that is graphically displayed by the multi-sector graphical interface element for transitioning among different superior and subordinate tiers using a vertical link. Operators move between tiers of the support hierarchy by virtually drilling down or backing up through various sector elements using the multi-sector graphical interface element. In some embodiments, the support hierarchy may take on a pyramid type structure.

The terms "primary tier," "secondary tier," "superior tier", and "subordinate tier" are used to describe operational support levels of a support hierarchy displayed by the multi-sector graphical interface element. In various embodiments, data and/or support instructions hosted at a particular tier is related to or linked to data and/or support instructions in vertically adjacent tiers. For example, in one embodiment, if a primary tier relates to an "order problems category", a secondary tier that is accessible by virtually drilling down through the primary tier (i.e., clicking on one sector element of the multi-sector graphical interface element) may include the most common order related issues that a support user could encounter (e.g., order not received, tracking number for order request, cancel order request, etc.).

The term "workflow enhance action" refers to a support operations step triggered, executed, or queued by the multi-application interactive support and communication system in the process of identifying and/or resolving a user support issue. Workflow enhance actions can include, without limitation, execution of a communication macro, adding one or more pre-defined text strings or "snippets" to a support user communication, or workflow enhance action to assist an operator to help a support user. In another embodiment, the workflow enhance actions comprise operational steps related to editing, removing, or adding, the communication macro via the multi-sector graphical interface element or from a listing of communication macros.

The term "support user communication" refers to a message, email, chat message, web interface post, or other transmission generated by the multi-application interactive support and communication system for effecting communication between an operator device and a support user device and/or between the user support device and the multi-application interactive support and communication system. In several embodiments, support user communications are generated automatically, at least in part, by operator engagement with the multi-application interactive support and communication interface. For example, support user communication message content may be drawn automatically from various text strings or snippets based on operator engagement with the multi-sector graphical interface element of the multi-application interactive support and communication system.

The term "resolution data communication" refers to transmission of information generated by the multi-application interactive support and communication system for effecting communication of a resolution for the dynamic support request between the operator device and the multi-application interactive support and communication system and/or between the multi-application interactive support and communication system and one or more service applications. In an example embodiment, resolution data communication content in the form of a transaction update to a database may be drawn automatically from transaction data associated with an executed user support workflow (defined below). For example, upon resolving a support issue associated with a dynamic support request, the multi-application interactive support and communication system is configured to trigger the opening of a summary or review of the operational steps, activities, or actions taken to solve or address the dynamic support request. The summary or review data is transmitted, for example, from the multi-application interactive support and communication system to one or more service applications via a resolution data communication for storage in a support resolution log of a database associated with the one or more service applications.

The term "user support decision tree interface" refers to a portion of the multi-application interactive support and communication interface that is configured to visually and virtually position an operator along a user support workflow based on the dynamic support request. In some embodiments, the user support decision tree interface may be informed by a machine learning technique for multivariate data analysis and classification. Decision trees can be used to derive easily interpretable and intuitive rules for decision support systems. To this end, the user support decision tree interface is used by the operator to identify one or more recommended resolution codes that may cause execution of a resolution to a support issue associated with a dynamic support request. In some embodiments, a tree of questions is generated by entering a root question or entry point of the user support decision tree interface. From the root question, the multi-application interactive support and communication application is configured to prompt the operator for a response to a next question. This is accomplished interactively between the multi-application interactive support and communication application and the operator. The multi-application interactive support and communication application is configured to require the operator to select a response from a plurality of possible responses to each question beginning with the root question. The multi-application interactive support and communication application then prompts for subsequent questions to each response. When no further questions are needed, i.e., the response to the question is a terminus or resolution action, the operator selects the resolution action determined by the multi-application interactive support and communication application.

The term "user support workflow" refers to a predefined set of operational steps or services and/or applications that are linked together in an executable process. For example, a refund workflow may be a sequence of steps, as determined by a user support decision tree, via which transaction data is routed to multiple applications and/or services, each of which perform a task such as processing, updating, reviewing or approving the refund request.

The term "resolution code" refers to an identifier for a resolution action or resolution workflow that is configured to correct or otherwise resolve a support issue associated with a dynamic support request.

The terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, and/or the like.

The terms "computer-readable storage medium" or "non-transitory memory medium" refers to a non-transitory, physical or tangible storage medium (e.g., volatile or non-volatile memory), which may be differentiated from a "computer-readable transmission medium," which refers to an electromagnetic signal.

Overview

Various embodiments of the invention are directed to a multi-application interactive support and communication interface (referred to herein simply as "MAISC interface") that is configured to be adaptive, intuitive, and to allow an operator (e.g., user support representative, customer support representative, a customer service advisor) to identify and resolve user support issues. The MAISC interface may be used as part of a standalone service, application, or device or it may be applied as a layer atop an existing service application or device. In an example embodiment, the MAISC interface may be embodied as software and delivered as part of an Enterprise Web Browser Extension or as part of a separate upload extension. Once installed on a client device, the browser extension may logically and/or physically become part of a browser and thus the user support functionality may become part of the browser functionality. This facilitates removing interactions with multiple open connections with multiple applications and/or services to identify and resolve user support issues.

The MAISC interface facilitates the execution of workflow enhance actions triggered, executed, or queued by the MAISC system in the process of identifying and/or resolving a user support issue. Workflow enhance actions can include, without limitation, execution of a communication macro configured to add one or more pre-defined text strings or "snippets" to a support user communication, or execution of an workflow enhance action to assist an operator to help a support user.

For example, if the dynamic support request discloses a particular user support issue, the MAISC interface may be configured to display a plurality of sector elements that are arranged in a support hierarchy based on the user support issue of the dynamic support request. In one example, the plurality of sector elements may include a series of drill down questions that seek additional operator input. The example drill down questions and presentation of sector elements are configured to gather further specific details in a controlled form.

As will be discussed in greater detail below, the MAISC interface is further configured to provide operators with real-time data from various service applications to assist the operator with user support decisions based on analytics and other data derived from such service applications. In another example embodiment, the MAISC interface may facilitate automatically executing processing jobs at a plurality of service applications according to workflow enhance actions.

The MAISC interface is configured to be used by an operator (e.g., a user support representative, customer support representative, a customer service advisor, and the like) and may be tailored to suit an individual operator's preferences, preferred configuration, or specific data needs.

The MAISC interface depicted in the figures appended to the present application is configured for operators associated with e-commerce platform. However, the inventive concepts herein described are not limited to an e-commerce platform and may be applied to any other type of multi-user system that is adapted to communicate with various services applications. For example, in other embodiments, the MAISC interface may be configured as a medical diagnosis interface or may facilitate real estate related issue resolution services. One of ordinary skill in the art will appreciate that the MAISC interface related concepts discussed herein, may be applied to better identify and resolve user support issues in a variety of industries.

Exemplary Architecture

FIG. 1 shows a user support system 100 including an example network architecture for a multi-application interactive support and communication (MAISC) system 115, which includes one or more devices and sub-systems that are configured to implement some embodiments discussed herein. Users may access MAISC system 115 via a communications network 114 using support user devices (i.e., client devices) 111. Operators access the MAISC system 115 using operator devices 112. The MAISC system 115 comprises a MAISC application 116 that is disposed in communication with a service application 125A, and a service application 125B, and a database 124.

Typically, operators using operator device 112 will access and communicate with database 124, service applications 125A and 125B, service applications 120A, 120B, and 120C and/or databases 126A and 126B through communications network 114. As shown in FIG. 1, the service applications 120A, 120B, and 120B and databases 126A, and 126B are external to the MAISC system 115. The service applications 120A, 120B, and 120C operate on a compiled code base or repository that is separate and distinct from that which supports the MAISC system. In some embodiments, the service applications 120A, 120B, and 120C may communicate with the MAISC system, and vice versa, through one or more application program interfaces (APIs).

In some examples, service applications 125A and 125B may include Bold360® and Zendesk®, and the like. In some examples, service applications 120A, 120B, and 120C may include Carpaccio, Gnocchi, Cyclops, Deal Catalog, a Content Flagging Service, Pizza Logger, and the like. In another example embodiment, the MAISC system may communicate with an updated list of service applications.

In various embodiments, the APIs define the protocol and procedural steps by which service applications 120A, 120B, and 120C may make its data available for access/ingestion by the MAISC system 115. The service applications 120A, 120B, and 120C provide user support service(s) via one or service applications accessed over the communications network 114 such as for providing support user account information, profile information, order information, as well as provide content storage services and content flagging services.

Communications network 114 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 114 may include a cellular telephone, an 802.11, 802.16, 802.20, and/or WiMAX network. Further, the communications network 114 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Web Socket channel. In some embodiments, the protocol is JSON over RPC ("remote procedural call"), JSON over REST ("Representational State Transfer")/HTTP ("HyperText Transfer Protocol"), and the like.

The databases 126A and 126B may be embodied as a data storage device such as a Network Attached Storage (NAS) device or devices, or as a separate database server or servers. The databases 126A and 126B comprise information accessed and stored by MAISC system 115 to facilitate the operations of the MAISC application 116. For example, the databases 126A and 126B may include, without limitation, support user contextual data. In another example embodiment, database 124 may also include support user contextual data.

The support user devices 110, 111 and the operator device 112 may be any computing device as defined herein. Electronic data received by the MAISC system 115 from the support user devices 110, 111 may be provided in various forms and via various methods. The operator device 112 and the support user devices 110, 111 may include desktop computers, laptop computers, smartphones, netbooks, tablet computers, wearables, and the like.

Additionally or alternatively, the support user devices 110, 111 and the operator device 112 may interact with the MAISC system 115 via a web browser. As yet another example, the support user devices 110, 111 and the operator device 112 may include various hardware or firmware modules designed to interface with the MAISC system 115.

The MAISC application 116 may be embodied as software and delivered as part of an Enterprise Web Browser Extension or as part of a separate upload extension. Once installed on an operator device 112 or a support user device 111, the browser extension may logically and/or physically become part of a browser and thus the MAISC interface functionality may become part of the browser functionality. In another example embodiment, where the operator device 112 is a mobile device, such as a smart phone or tablet, the operator device 112 may execute an "app" to interact with the MAISC application 116. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. In an example embodiment the app directs the operator to MAISC interface functionality, from which the operator is able to navigate and browse among offered support user data elements. The MAISC interface serves as a single point (e.g., one-stop) source for all of resolution service needs of the operator of the MAISC application 116 to resolve user support issues. Through the MAISC interface, the operator is provided with a plurality of workflow enhance actions to solve the dynamic support request. To this end, the MAISC application 116 is configured to aggregate and correlate support user context data to candidate resolution codes and provide for access to one or more service applications 125A, 125B, 120A, 120B, and/or 120C via the MAISC interface without initiating a new executable application instance for each of the one or more service applications 125A, 125B, 120A, 120B, and/or 120C. As such, resource contention amongst resource-deprived service applications within the operator device 112 computing system is avoided.

Example Apparatus for Implementing Embodiments of the Present Disclosure

FIG. 2 shows a schematic block diagram of circuitry 200, some or all of which may be included in, for example, MAISC application 116. Any of the aforementioned systems or devices may include the circuitry 200 and may be configured to, either independently or jointly with other devices in a communications network 114 perform the functions of the circuitry 200 described herein. As illustrated in FIG. 2, in accordance with some example embodiments, circuitry 200 may comprise various means, such as processor 210, a memory 212, input/output circuitry 220, communications circuitry 222, API handler circuitry 226, and MAISC application logic 224. The circuitry 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the circuitry 200 may provide or supplement the functionality of particular circuitry. For example, the processor 210 may provide processing functionality, the memory 212 may provide storage functionality, the communications circuitry 222 may provide network interface functionality, and the like.

In some embodiments, the processor 210 (and/or co-processor or any other processing circuitry assisting or otherwise associated with the processor) may be in communication with the memory 212 via a bus for passing information among components of the apparatus. The memory 212 may be non-transitory and may include, for example, one or more volatile and/or non-volatile memories. In other words, for example, the memory may be an electronic storage device (e.g., a computer readable storage medium). The memory 212 may be configured to store information, data, content, applications, computer coded instructions, or the like, for enabling the circuitry 200 to carry out various functions in accordance with example embodiments of the present disclosure.

The processor 210 may be embodied in a number of different ways and may, for example, include one or more processing devices configured to perform independently. Additionally or alternatively, the processor may include one or more processors configured in tandem via a bus to enable independent execution of computer coded instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 210 is configured to execute computer coded instructions stored in the memory 212 or otherwise accessible to the processor. In various embodiments, the processor 210 is configured to execute computer coded instructions provided by MAISC application logic 224.

Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the computer coded instructions may specifically configure the processor to perform the algorithms and/or operations described herein when the computer coded instructions are executed.

In some embodiments, the circuitry 200 may include input/output circuitry 220 that may, in turn, be in communication with processor 210 to provide output to the user and, in some embodiments, to receive an indication of a user input. The input/output circuitry 220 may comprise a user interface and may include a display and may comprise a web user interface, a mobile application, a client device, a kiosk, or the like. In some embodiments, the input/output circuitry 220 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 212, and/or the like).

The communications circuitry 222 may be any means such as a device or circuitry embodied in either hardware or a combination of hardware and software that is configured to receive and/or transmit data from/to a network and/or any other device, circuitry, or module in communication with the circuitry 200. In this regard, the communications circuitry 222 may include, for example, a network interface for enabling communications with a wired or wireless communication network. For example, the communications circuitry 222 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In one example, the circuitry 200 may include a MAISC application logic 224 configured to facilitate all functionality described herein associated with the MAISC application 116 and to facilitate operator interaction with multiple service applications (e.g., 120A, 120B, 125A, 125B, 125C). In different examples, the MAISC application logic 224 may be implemented in hardware, software, firmware, and/or combinations thereof. In one embodiment, the operator device 112 of FIG. 1 is configured to run a web browser that is operably connected to the MAISC system. In this way, such web browser is configured to render a MAISC interface. In other embodiments, the operator device 112 of FIG. 1 is configured with an installed MAISC software application that is configured to communication with the MAISC system 115 and thereby configured to render a MAISC interface. In various embodiments, the MAISC application logic 224 includes data and instructions that are executed by processor 210.

The API handler circuitry 226 is operable to handle the various API calls to and from the service applications. For example, the API handler circuitry 226 may handle an API call to update a support user's order information associated with a selected service application. In an example embodiment, MAISC application logic 224 is configured to subscribe to an API of a service application to receive updates from the service application.

As described above and as will be appreciated based on this disclosure, embodiments of the present disclosure may be configured as computer implemented methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code instructions stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Example Data Flows

FIGS. 3, 4A, 4B, and 4C illustrate various interactions between the following system components shown in FIG. 1: support user devices 110, 111, operator device(s) 112, service applications 125A, 125B, MAISC application 116, and service applications 120A, 120B, 120C. Referring now to FIG. 3, the process illustrates example operations performed by a MAISC application 116 for outputting to a MAISC interface a display interface (i.e., a graphical user interface) of an operator device.

The process illustrated in FIG. 3 starts at step 300, where a support user device, for example support user devices 110, 111, transmits a communication to the MAISC system 115 comprising service application 125A and MASIC application 116. In an example embodiment, support user devices 110, 111 are configured to communicate via communications network 114 with one or more service applications 125A and/or 125B (e.g., customer relationship management (CRM) systems, communication platforms, etc.). In an example embodiment, service application 125A is then configured to receive and forward the communication received from the support user device 110 to the MAISC application 116, as shown by 301A of FIG. 3. In an example embodiment the communication may be associated with a dynamic support request. A dynamic support request includes an electronic information package used by the MAISC application 116 to update a MAISC interface. In response to receiving the communication from the support user device 110 via the service application 125A, the MAISC application 116 may send information to and receive information from the one or more service applications 125A, 125B, 120A, 120B, and/or 120C to construct and/or generate the dynamic support request. For example, support user account identifier and the support user issue data may be extracted from the dynamic support request. In 301B, the MAISC application 116 is configured to receive the dynamic support request comprising the support user account identifier and the support user issue data.

In the depicted example, the dynamic support request comprises a support user account identifier and support user issue data (that are transmitted as an electronic information package) that are structured for receipt by the MAISC application 116 of the MAISC system 115. The MAISC application 116 may manage a plurality of dynamic support requests. The routing of the dynamic support request may be based on various rules or settings that are intended to encourage quick resolution of user support issues, reduce support user wait time, and distribute operator workloads. For example, in one embodiment, routing of a dynamic support request is based on a rule set that is configured to reduce the number of dynamic support requests received by a particular operator while, at the same time, assuring sufficient levels of response quality, response timing, and/or customer satisfaction.

In one embodiment, the MAISC application 116 is configured to identify support user contextual data based on at least the user account identifier and/or the support user issue data. In one embodiment, the support user issue data includes an order identifier associated with a particular transaction that is of interest to the support user associated with the dynamic support request. In step 302A, the MAISC application 116 causes service application 120A to query database 126A for support user contextual data based on the user account identifier, support user issue data, and/or order identifier. In another embodiment, the MAISC application 116 may cause service application 125A to query database 124 for support user contextual data based on the user account identifier, support user issue data, and/or order identifier. In still other embodiments, the MAISC application 116 may cause service applications 120B, 120C to query either or both of databases 126A, 126B for support user contextual data based on the user account identifier, support user issue data, and/or order identifier.

In step 303, the MAISC application 116 is then configured to update the plurality of support user data elements of the MAISC interface based on the support user contextual data. In one example, FIG. 5D illustrates various support user data elements 510B of an example MAISC interface. Such example support user data elements include the name of the support user, the support user's email address, the support user's segment, an order ID associated with the dynamic support request, a status of the order, and/or any other information that may be used to identify the support user or a support user account.

In step 304, the MAISC application 116 is configured to output or update a MAISC interface comprising a plurality of support user data elements and a multi-sector graphical interface element. An example multi-sector graphical interface element is illustrated in FIG. 5B as element 503B. The depicted multi-sector graphical interface element 503B is configured to support operator interaction with a plurality of service applications to assist the operator with user support decisions based on analytics and other data derived from such service applications. The depicted multi-sector graphical interface element includes a plurality of sector elements that are configured into a support hierarchy to identify and resolve user support issues based on the dynamic support request.

Returning to FIG. 3, in step 305, the operator device 112 is configured to render the MAISC interface comprising the plurality of support user data elements and the multi-sector graphical interface element. The multi-sector graphical interface element is configured to facilitate operator interaction with multiple service applications, such as service application 125A, as discussed above.

FIG. 4A illustrates the subsequent operations for transmitting a support user communication to the support user device 110 in response to the dynamic support request, the operations proceeding to follow FIG. 3 in reference to connector 3. In an example embodiment, the multi-sector graphical interface element comprises a plurality of sector elements that are engageable by the operator via the computer interface of the operator device. For example, the multi-sector graphical interface element includes interactive interface buttons as sector elements that are engageable by the operator to "drill up" and/or "drill down" through tiers of the support hierarchy. As used herein, the terms "drill down" and "drill up" or "back up" refers to moving between tiers of the support hierarchy. Generally, drilling down narrows the resolution of data presented (e.g., by filtering the resolution of data presented) and drilling up increases the data included in the presentation (e.g., by removing filters).

In step 401, the operator device 112 generates and transmits to the MAISC application 116 a sector input selection associated with one of the plurality of sector elements based on operator engagement with the MAISC interface (i.e., an operator selection of one of the plurality of sector elements via the user interface of the operator device).

Figure 6A:
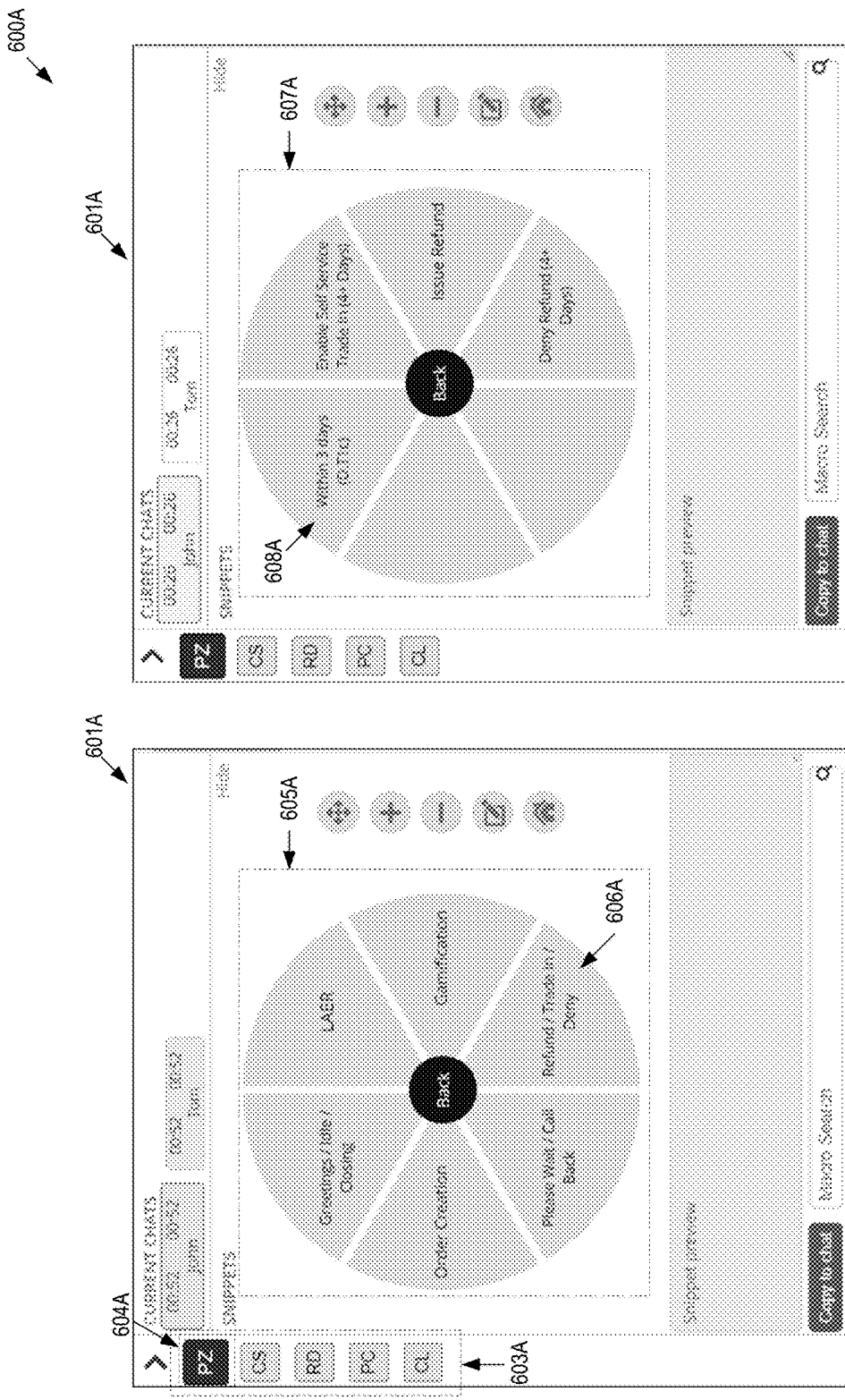
Figure 6B:
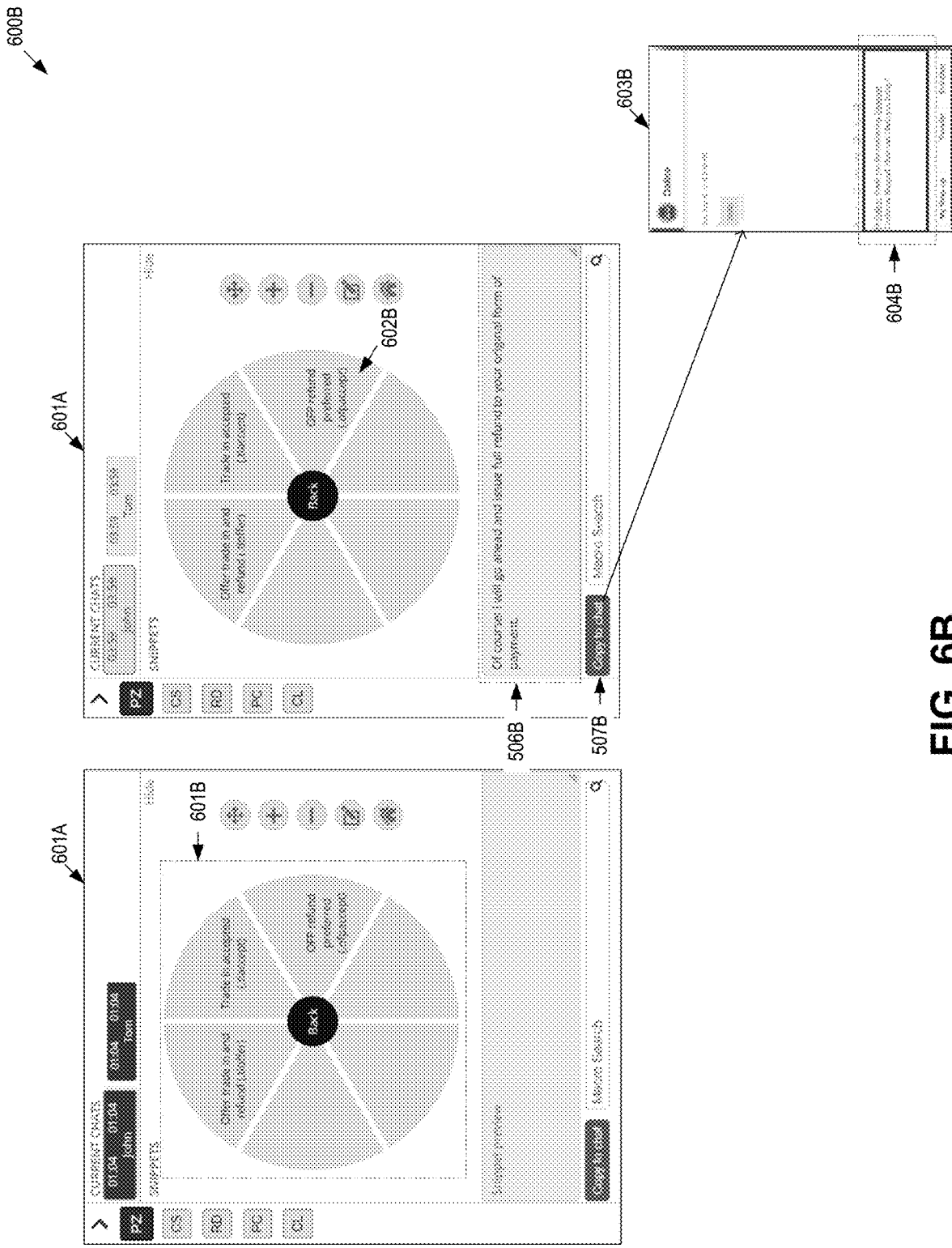

In step 402, the MAISC application 116 receives the sector input selection in response to operator engagement of one of the plurality of sector elements. In step 403, the MAISC application 116 updates the plurality of sector elements to display a secondary tier of the support hierarchy in response to the sector input selection. In an example embodiment, as discussed above, operators move between tiers of the support hierarchy by virtually drilling down or backing up through various sector elements using the multi-sector graphical interface element as shown in FIGS. 6A and 6B. In some embodiments, the support hierarchy may take on a pyramid type structure.

In step 404, the operator device 112 displays the updated plurality of sector elements. In various embodiments, data and/or support instructions hosted at a particular tier is related to or linked to data and/or support instructions in vertically adjacent tiers. For example, in one embodiment, if a primary tier relates to an "order problems category", a secondary tier that is accessible by virtually drilling down through the primary tier (i.e., clicking on one sector element of the multi-sector graphical interface element) may include the most common order related issues that a support user could encounter (e.g., order not received, tracking number for order request, cancel order request, etc.).

In step 405, the operator device 112 generates and transmits a sector input selection of one of the updated plurality of sector elements based on operator engagement with the MAISC interface (i.e., an operator selection of one of the plurality of sector elements via the user interface of the operator device). The MAISC application 116 receives the sector input selection and is configured, in one embodiment, to trigger execution of a communication macro comprising commands related to inserting predetermined text strings into a support user communication interface as shown in step 406. In one embodiment, a communication macro can refer to a program, or portion of a program, which will execute a plurality of workflow enhance actions at each of the multiple service applications thereby saving the user from having to manually perform the actions one by one.

In an example embodiment, the support user communication interface may include an email messaging interface, a chat messaging interface, web messaging interface or the like that may be provided or supported by a service application. In an example embodiment, the MAISC application 116 is configured to cause display of the support user communication interface from the service application running on the operator device.

Conventional service applications may include a messaging service that provides for users to communicate with a customer service representative, however, such customer service representative would be required to manually type a response to a user's request for assistance. It is often the case that such customer support representative is required to copy and paste information into his/her response, which is time consuming, prone to errors, and inefficient. In addition, the format of the entered information needs to be either pre-configured or adjusted to fit a format required for the messaging application in question or must specify the support user, the support user's account, and/or the support user's specific issue.

The MAISC application 116 addresses these problems by providing, in one example, communication macros to be used in formulating responses without needing the operators to copy and paste that information. As such, in step 407, the MAISC application 116 is configured to push the predetermined text strings for insertion into the support user communication.

In step 408, service application 125A receives the predetermined text strings for insertion into the support user communication. The service application 125A will then transmit the support user communication to the support user device 110 as shown in step 409. For example, the MAISC application 116 transmits the support user communication to a service application 125A configured to provide a support user communication interface. In this example embodiment, the support user communication interface of the service application 125A is not native to the MAISC application and its interfaces. In step 410, the support user device 110 receives the support user communication.

FIG. 4B illustrates the subsequent operations to follow block 400 of FIG. 3, the operations include transmitting an issue resolution communication to the support user device 110 in response to the dynamic support request.

In step 411, the MAISC application 116 is configured to output, to a computer interface, the MAISC interface comprising a support user decision tree interface that is configured along a user support workflow based on the dynamic support request.

FIG. 7A depicts the support user decision tree interface that is configured to visually and virtually position an operator along a user support workflow based on the dynamic support request. In some embodiments, the user support decision tree interface may be informed by a machine learning technique for multivariate data analysis and classification. In an example embodiment, the MAISC application 116 is configured for analyzing the dynamic support request and establishing decision tree data from the database 124. The database 124 comprises decision tree data structures which, in some embodiments, contain questions to be presented to an operator for a given session and answers to such questions as received as operator inputs through the support user decision tree interface are handed off to the MAISC application 116. The MAISC application 116 is configured to store the answers in database 124 and then determine what questions to navigate to next based on the answers and the decision tree data structures stored in the database 124. The MAISC application 116 further processes the answers to obtain recommendations for decisions. The operator device 112 renders the MAISC interface comprising the user support decision tree interface as shown in step 412.

In some embodiments, the user support decision tree interface of FIG. 7A shows the operator one or more identified recommended resolution codes that may cause execution of a workflow enhance action to solve the support issue associated with a dynamic support request. The recommended resolution codes are identified by the MAISC system 115 by, at least in part, parsing support user issue data associated with the dynamic support request. The user support decision tree interface allows the operator to choose to select possible recommended resolution codes from a plurality of candidate resolution codes during subsequent generations of questions. The user support decision tree interface is configured to facilitate traversal of the user support workflow based on operator engagement with the user support decision tree interface. In step 414, the MAISC application 116 is configured for facilitating identification of one or more recommended resolution codes associated with the dynamic support request. In an example embodiment, candidate resolution codes for a same support user issue may be clustered together based on the content, text, or metadata of the support user issue data, for example, candidate resolution codes linked to a same support user issue will be grouped together. Similarity between support user issue data can be determined using a frequency of certain text in the support user issue data.

Candidate resolution codes that no longer correspond to a decision branch are removed from the population of candidate resolution codes (e.g., if a score of the candidate resolution code does meet a threshold (decision block 708A, yes branch 709A), the candidate resolution code associated with the score is displayed to the operator as the recommended resolution code. If the score does not meet the threshold (decision block 708A, no branch), the remaining candidate resolution codes are re-scored. The score for each candidate resolution code is based on the relevance of the candidate resolution code with respect to the support issue, which can be determined by a comparison of content, metadata, or topic similarity with the received support issue. The process of re-scoring will result in removal of candidate resolution codes that are inconsistent with the additional constraints provided in the decision tree as a result of candidate resolution selection. In some embodiments, upon selection of a candidate resolution code, questions are displayed, wherein each question generally has at least one question option or answer. In most cases, there are multiple answers to choose from. The iterative process of removing and re-scoring candidate resolution codes may result in one or more recommended resolution codes. These recommended resolution codes being recommended by the MAISC application 116 as the most likely to resolve the support issue associated with the dynamic support request. In some examples, the questions may contain a candidate or recommended resolution code identifier, question text, or other question related fields. In step 415, the operator device 112 displays the identified one or more candidate resolution codes. The highest scoring recommended resolution code is thus displayed, and information about all the candidate resolution codes in each user support decision tree interface branch are stored so that the operator can review and/or candidate resolution codes from the most recent completed generation or previously-completed generations. In an example embodiment, the highest scoring recommended resolution codes is indicative of a determined likeliness to solve the support issue associated with the dynamic support request.

The candidate resolution code identifier may be used to link a workflow enhance action with one or more answer options. In step 416, the operator device 112 initiates a selection of one of the candidate resolution codes. In step 417, the MAISC application 116 is configured for triggering execution of a workflow enhance action comprising commands to solve the support issue associated with the dynamic support request.

In an example embodiment and as shown in FIG. 7B, the execution of the workflow enhance action includes applying macro 702B. For example, the macro 702B can refer to a program, or portion of a program, which will execute a plurality of workflow enhance actions in series thereby saving the user from having to manually perform the actions one by one. The resulting macro 702B may be communicated to one or more service applications through the communications circuitry 222 via the communications network 114.

In an example embodiment, the MAISC system 115 may define macros for different service applications (e.g., e-mail macros, refund macros, order history macros, promotional deal macros, etc.). For example, a macro for sending a password reset email may include actions to be performed by the MAISC system 115, service applications 125A, 125B and/or service applications 120A, 120B, and 120C, and so on. For example, the operator may trigger execution of the password reset macro by selecting a corresponding resolution code of the user support decision tree interface. In some implementations of this embodiment, the MAISC system 115 may execute the password reset macro. In executing the password reset macro, the MAISC system 115 may transmit one or more signals to the one or more application services specifying for the application service(s) to collect support user contextual data, execute one or more programs related to resetting a password, transmit one or more instructions to the MAISC interface for providing instructions to reset the password, and so on.

In an embodiment of the disclosure, the MAISC system 115 may interact with one or more service applications 125A and/or 125B internal to the MAISC system 115. Additionally or alternatively, the MAISC system 115 may interact with one or more service applications 120A, 120B, and/or 120C external to the MAISC system 115. In yet another example embodiment, the MAISC system 115 may interact with one or more databases 126A and/or 126B via the service applications 120A, 120B, and/or 120C external to the MAISC system 115. For example, any one of the above-mentioned service applications and their associated databases may reside on the same computer system or reside on different computer systems that communicate over a network.

In step 418, the service application 125A executes the workflow enhance action. In step 419, the service application 125A completes the workflow enhance action. For example, the service application 120A may be a merchant service associated with a deal or promotion selected for purchase by a support user. If the service application 120A determines that the selected deal is sold out, a resolution communication may be produced comprising a communication macro having predetermined text informing the support user that the selected deal is currently unavailable.

The MAISC application 116 is configured for receiving an indication that the workflow enhance action is complete as shown in step 420. In step 421, the MAISC application 116 is configured for outputting an issue resolution communication selected based on the one or more candidate resolution codes to a support user device associated with the dynamic support request. Thereafter, the MAISC application 116 is configured for transmitting the issue resolution communication to the support user device as shown in step 422 and, as shown in step 423, the support user device 110 receives the issue resolution communication.

FIG. 4C illustrates the subsequent operations to follow FIG. 3, the operations include facilitating editing a communication macro. In step 424, the MAISC application 116 is configured for outputting, to the computer interface, a MAISC selector interface comprising a plurality of workflow enhance actions at each of the multiple service applications. In an example embodiment, the MAISC selector interface is a menu of service applications used in identifying and resolving support user issues.

For example, FIG. 8A provides a service application for account actions and order actions (e.g., reset password, unsubscribe, reactivate, deactivate, add bucks). The order history information may be pre-filled from one or more databases 126A and/or 126B. FIG. 8B provides a service application for communicating deal recommendations to a support user based on the support user's browsing history and/or order history. In an example embodiment, in situations where user data is required to complete an action such as communicating a deal recommendation, the MAISC selector interface is configured to use information that it currently has about the support user to pre-fill any form needed to communicate the deal recommendation. For example, the MAISC selector interface may fill out a deal recommendation form with support user information retrieved from a user profile or user account.

FIG. 8B further provides a service application for providing eligible promotion codes to a support user. The MAISC selector interface provides a promotion code assistant to deliver eligible promotion codes to support users. Based on the MAISC system observing and recording interactions of the operator and/or communications between the operator and the support user, the MAISC selector interface may be configured to provide suggested eligible promotion codes and/or other forms of assistance to the operator so as to fine tune support in response to the dynamic support request.

In step 425, the operator device 112 renders the MAISC selector interface. In an example embodiment, the plurality of workflow enhance actions provided via the MAISC selector interface comprise operational steps related to one or more of executing a communication macro, initiating a workflow enhance action to resolve the dynamic support request, or editing the communication macro. In step 427, the operator device 112 initiates a selection of one of the workflow enhance actions related to editing the communication macro. In response, the MAISC application 116 is configured for retrieving the list of communication macros a shown in block 428. In step 429, the MAISC application 116 is configured for outputting to the MAISC selector interface a list of communication macros. In step 430, the operator device 112 renders the MAISC selector interface comprising the list of communication macros.

FIG. 8C illustrates a list of communication macros that are editable by the operator device 112. In step 431, the operator device 112 initiates editing a particular communication macro. In response, the MAISC application 116 is configured for facilitating editing the particular communication macro as shown in step 432. FIG. 8C shows an example editing window provided by the MAISC selector interface.

Exemplary Operator Graphical User Interfaces

FIGS. 5A-5E, 6A-6F, 7A-7C, and 8A-8C show example graphical user interfaces that may be presented by one or more display screens of one or more computing devices for implementing an example configuration according to various embodiments. For example, the graphical user interfaces of 5A-5E, 6A-6F, 7A-7C, and 8A-8C can be presented to an operator by an operator device such as a desktop or laptop computer, or a mobile, handheld, or other client device. The depicted graphical user interfaces are configured to aid in facilitating the identification and resolution of user support issues.

Figure 5A:
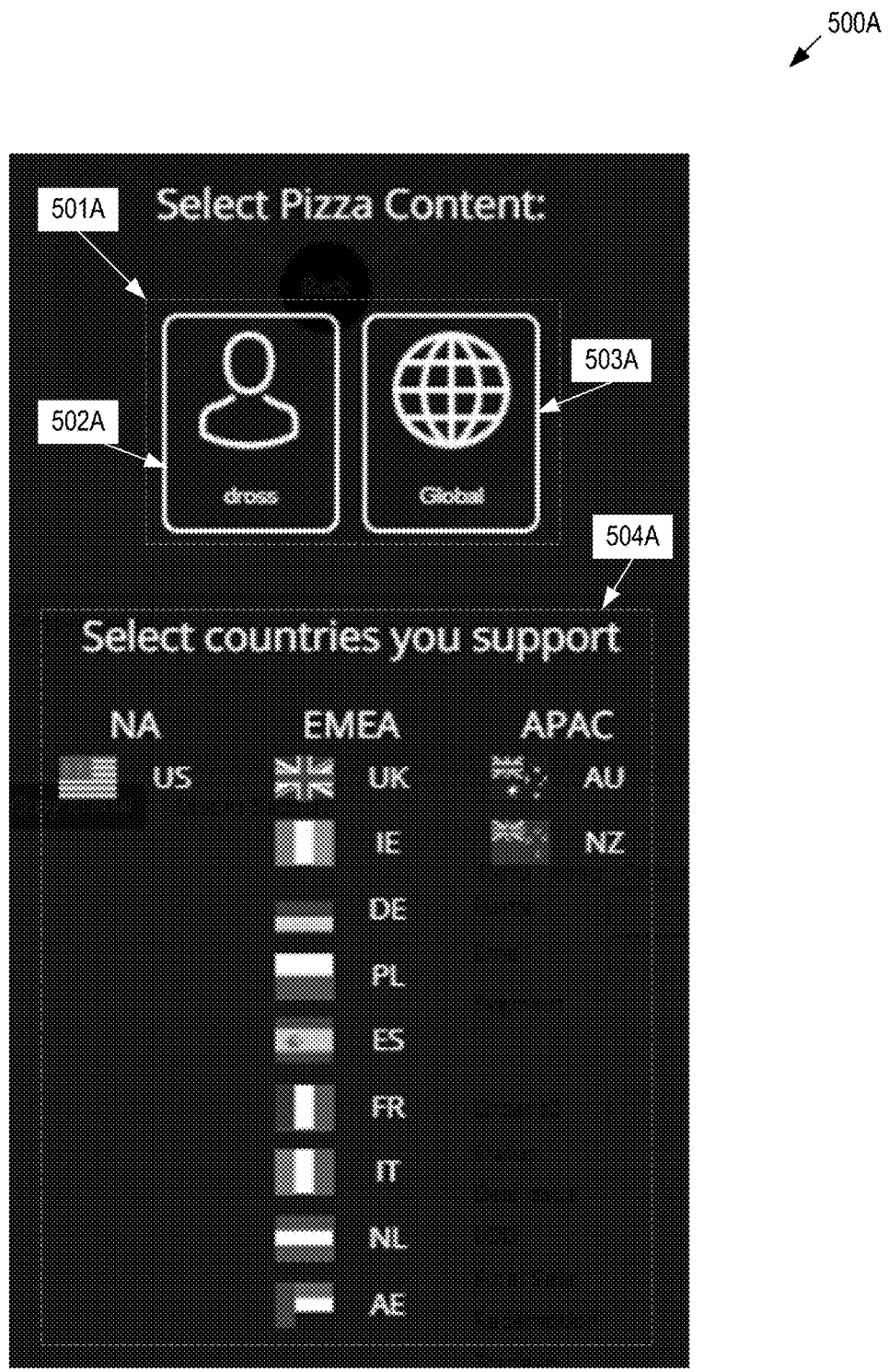
Figure 5B:
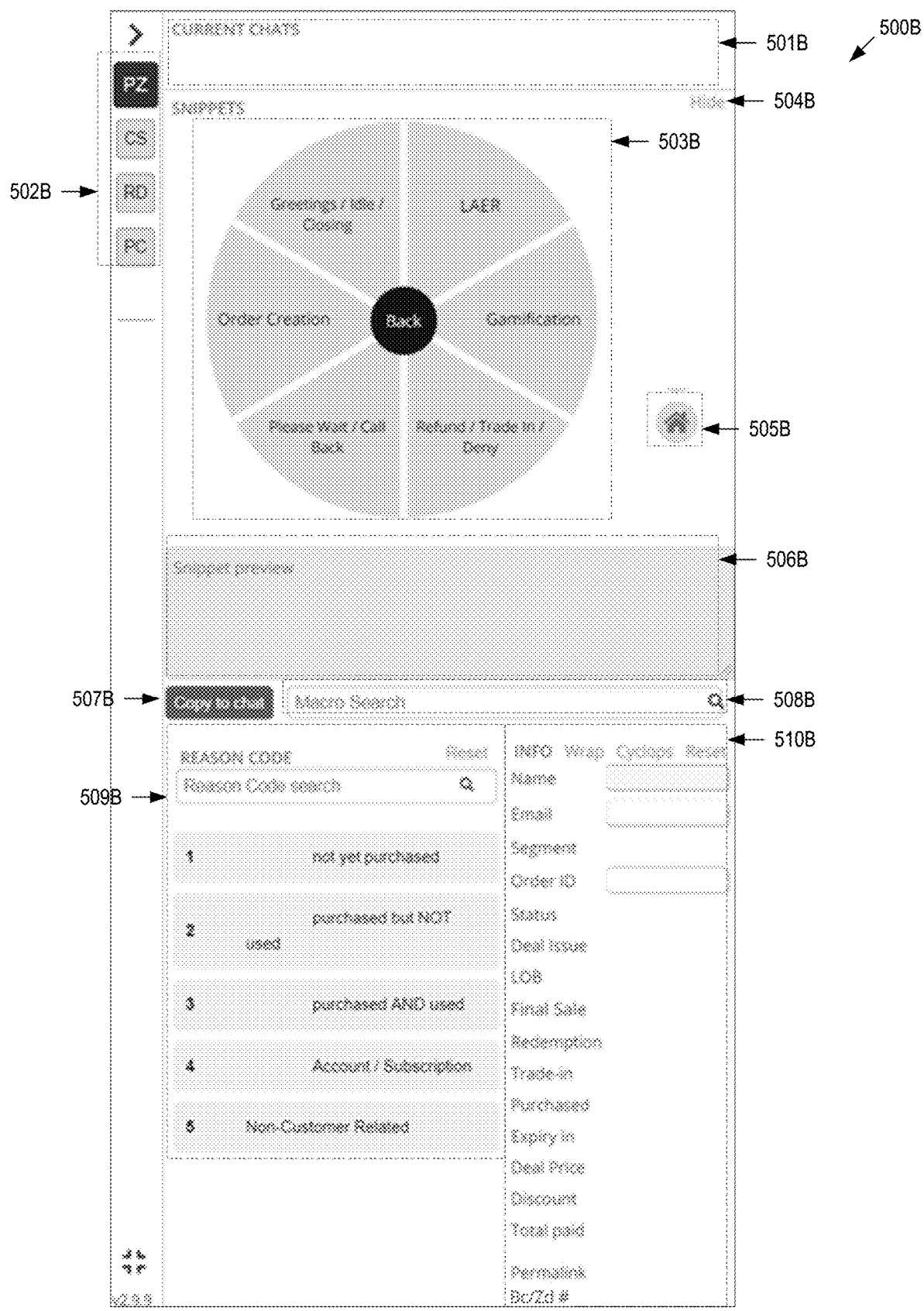

FIG. 5A, for example, illustrates a MAISC operator account selection interface 500A. The MAISC operator account selection interface provides two login options as shown by 501A. A user or operator may login as a particular operator account 502A (e.g., "dross") or a global operator account 503A. When logged in as operator account dross, the operator accesses a custom interactive support interface and works with support user communication message content customized by operator account "dross". Alternatively, if the operator logs in under global operator account 503A, the operator accesses a global interactive support interface and works with a standard, uneditable support user communication message content preapproved by the MAISC system.

The MAISC operator account selection interface 500A further provides the operator the ability to support a plurality of languages from a plurality of geographic regions as shown by 504A of FIG. 5A. Additionally or alternatively, the MAISC system may automatically recognize and determine a support user's region based on the dynamic support request and may set or switch to a corresponding language and/or geographic region.

FIG. 5B illustrates a global interactive support interface 500B returned by the MAISC application. The global interactive support interface 500B includes a plurality of MAISC interfaces. The global interactive support interface 500B is built according to standard, uneditable support user communication message content preapproved by the MAISC system. The plurality of MAISC interfaces includes a support user conversation interface 501B comprising one or more support user conversation interface elements (not shown); a multi-application interactive support and communication selector interface 502B; a multi-sector graphical interface element 503B; a multi-sector graphical interface element visibility element 504B configured to show or hide the multi-sector graphical interface element 503B from the global interactive support interface 500B; a MAISC operator account selection return element 505B configured to return to the primary tier of the multi-sector graphical interface element 503B; a support user communication message content preview interface 506B; a support user communication interface posting element 507B configured to post or transmit contents of the support user communication message content preview interface 506B to an associated support user conversation interface element; a workflow enhance action search element 508B; a user support decision tree interface 509B; and a support user account and order status interface 510B. These MAISC interfaces are discussed in greater detail below.

In one example, upon selection of a sector element of the multi-sector graphical interface element 503B, the support user communication message content preview interface 506B may be prefilled with one or more pre-defined text strings associated with the selected sector element as shown by FIG. 5B. According to at least one embodiment of the present disclosure, the MAISC application is configured to copy the one or more pre-defined text strings into a support user communication interface. Additionally or alternatively, at least one of the MAISC interfaces may provide the operator the ability to search for a particular macro, pre-defined text string, and/or snippet as shown by 508B of FIG. 5B.

Merely by way of example, in an illustrated embodiment, an operator has selected a first sector element as a filter criteria, and that filter criteria is indicated on the multi-sector graphical interface element. Upon selection of the first sector element, the multi-sector graphical interface element changes to a different tier having different sector elements. The operator can thus select a second sector element of the multi-sector graphical interface element. In this way, the multi-sector graphical interface element is configured to "drill down" into the tiered command structures of the display hierarchy to identify and resolve user support issues. In addition, the user might be given the option to "back out" (i.e., remove the first sector element filter criteria) and return to the previous display hierarchy. The multi-sector graphical interface element is configured to provide a selection mechanism (in the form of a sector element, in this case) that allows the operator to select a value used to filter the data that is displayed. In other words, the value or selected sector will be used as filter criterion to drill down further into the data to resolve user support issues and/or provide an appropriate response to the dynamic support request.

FIG. 5B depicts a multi-sector graphical interface element 503B that displays a plurality of sector elements allowing the operator to drill down into the pre-defined text strings or "snippets" data according to one or more dimensions. As used herein, the terms "drill down" and "drill up" refers to moving between operation support levels or tiers within a support hierarchy. Specifically, a move from a current tier (e.g., primary tier) in the support hierarchy to a higher tier (e.g., secondary tier) is referred to as "drilling up," while a move from a current tier (e.g., superior tier) to a lower tier (e.g., subordinate tier) is referred to as "drilling down." Generally, drilling down narrows the pre-defined text strings or "snippets" data presented on the multi-sector graphical interface element 503B and drilling up increases the pre-defined text strings or "snippets" data included in the presentation (e.g., by removing filters). In addition, the operator is given the option to "back out" of the drill down path tier by tier as shown by the back graphical user interface element 511B.

Figure 5C:
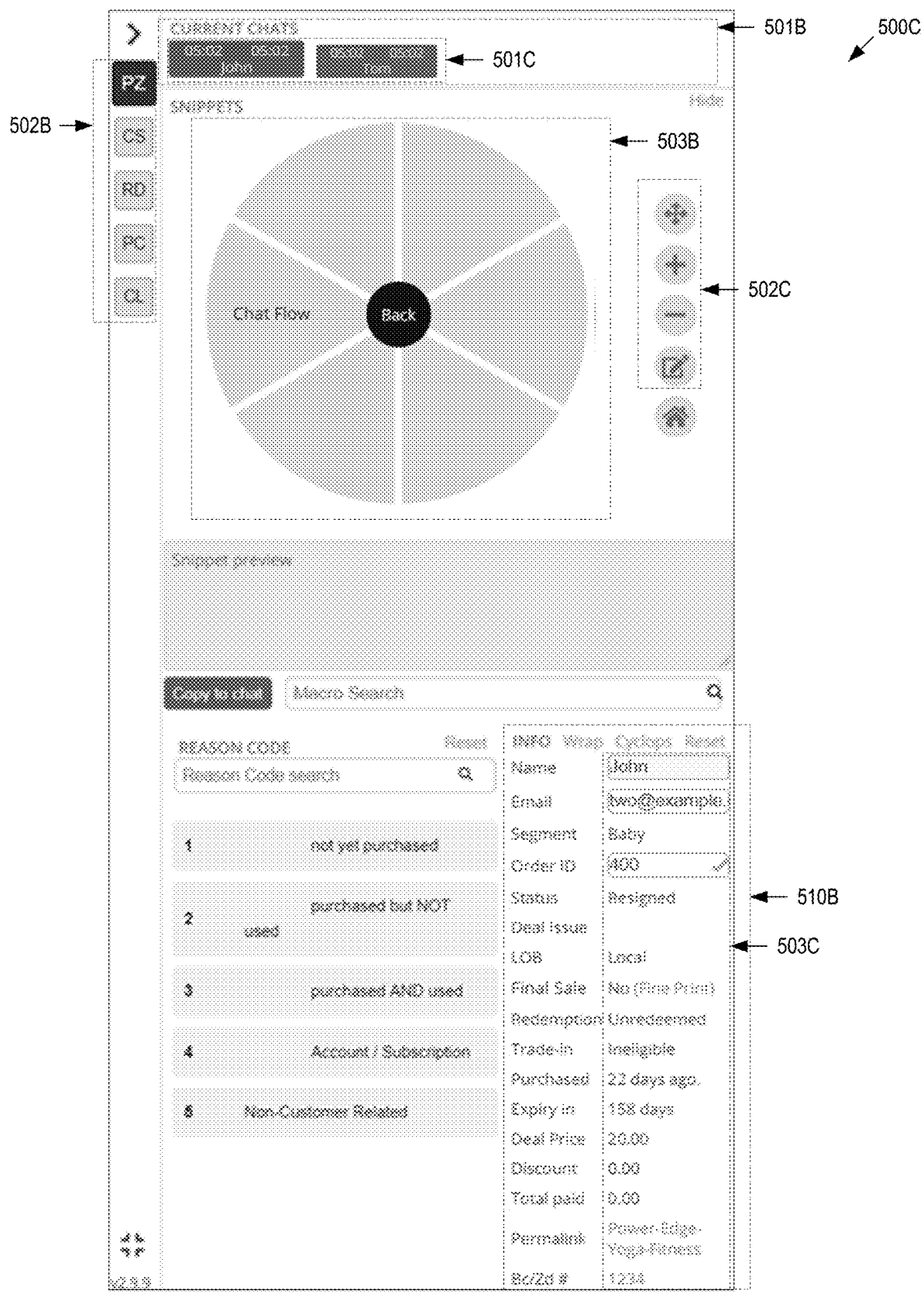
Figure 5D:
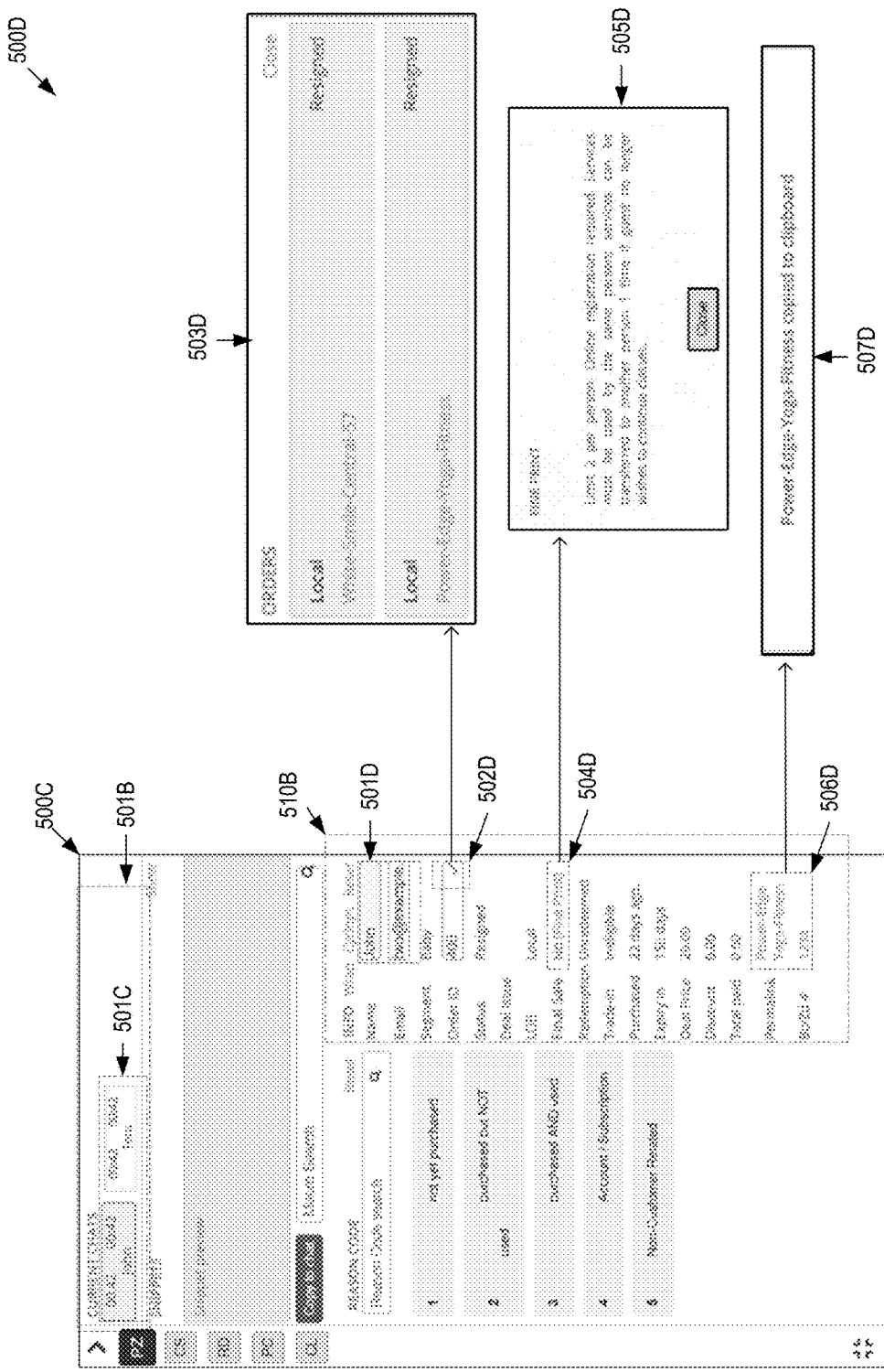

FIG. 5C illustrates a custom interactive support interface 500C returned by the MAISC application. The custom interactive support interface 500C, similar to the global interactive support interface, includes a plurality of MAISC interfaces. The custom interactive support interface 500C is built according to support user communication message content customized by a particular operator account. The plurality of MAISC interfaces includes a support user conversation interface 501B comprising one or more support user conversation interface elements 501C; a multi-application interactive support and communication selector interface 502B; a multi-sector graphical interface element 503B; a multi-sector graphical interface element visibility element 504B configured to show or hide the multi-sector graphical interface element 503B from the custom interactive support interface 500C; a support user communication message content preview interface 506B; a support user communication interface posting element 507B configured to post or transmit contents of the support user communication interface to an associated support user conversation interface element; a workflow enhance action search element 508B; a user support decision tree interface 509B; and a support user account and order status interface 510B. These MAISC interfaces are discussed in greater detail below.

In an example embodiment, the MAISC application is configured to monitor the one or more support user conversation interface elements 501C since operators are likely to jump in and out of continuous conversations with a plurality of support users. The MAISC application is configured to store the one or more support user conversation elements to database 124 in order to monitor chat messages within the chat window. Each support user chat session is associated with a support user identifier (ID), order ID, support user account, session timestamp, chat window message discussion thread ID, and a dynamic support request. For example, in one embodiment, if timestamp(s) associated with support user chat session indicates a support user wait time is above a predetermined threshold, the MAISC application 116 is configured to generate a visual alert (e.g., blink red after 45 seconds) to a MAISC interface, thereby alerting the operator that a support user response is needed.

In one example embodiment, a visual alert configured for display to the MAISC interface may be based on a lack of response received from a support user device within a threshold period of time. FIG. 5C shows example support user chat sessions having support user conversation interface elements 501C from support user John and support user Tom. The support user conversation interface elements 501C further indicate the time duration of the respective chat session provided by service application 125A The custom interactive support interface 500C further includes a multi-application interactive support and communication selector interface 502B having one or more service applications available on the custom interactive support interface 500C and not on the custom interactive support interface 500C. These service applications available only on the custom interactive support interface 500C via the multi-application interactive support and communication selector interface 502B will be discussed in greater detail below.

In another example embodiment, the custom interactive support interface 500C further includes, in addition to the MAISC operator account selection return element 505B, a plurality of multi-sector graphical interface customization elements 502C which will be discussed in greater detail below.

In contrast, the global interactive support interface 500B does not provide the plurality of multi-sector graphical interface customization elements 502C because the global interactive support interface 500B does not allow the customization of support user communication message content.

Returning to FIG. 5C, the MAISC application receives one or more dynamic support requests associated with one or more support users currently engaged in conversations with an operator via one or more respective support user conversation interface elements 501C. The MAISC application may then output, to a computer interface, the MAISC interface comprising a plurality of support user data elements. For example, support user account and order status interface 510B is prefilled with one or more support data elements 503C.

In an example embodiment, the MAISC application is configured to update the plurality of support user data elements of the multi-application interactive support and communication interface based on the support user contextual data. For example, the support data elements 503C may be updated based on which support user conversation interface element the operator is currently engaged with. In the example shown in FIG. 5C, the operator is engaged with support user John and John's support user data elements comprising account and order information are displayed via the support user account and order status interface 510B.

A. Support User Account and Order Status Interface

FIG. 5D shows the custom interactive support interface 500C comprising an exemplary support user account and order status interface 510B. The support user account and order status interface 510B comprises a plurality of support data elements. The support data elements may include data related to the support user account and the support user's orders. In an example embodiment, the MAISC application transmits a request signal to one or more application services requesting account and/or order information associated with the support user account identifier and/or an order identifier associated with the support user that is derived from the support user issue data. The one or more application services may then, in response to the request, transmit the requested account and/or order information.

In an example embodiment, the operator may select from the support user conversation interface 501B at least one of the support user conversation interface elements 501C. Each of the support user conversation interface elements 501C represents a chat session in which messages are exchanged between the support user and operator. In an example embodiment, each of the support user conversation interface elements 501C may be associated with a dynamic support request including a support user account identifier and/or support user issue data. If an operator selects a particular support user conversation interface element, the MAISC application transmits a request signal to one or more service applications 120A-120C requesting account and/or order information based on the support user account identifier and/or an order identifier that is derived from the support user issue data. The one or more application services may then, in response to the request, transmit the requested account and/or order information to the MAISC application. Accordingly, the plurality of support user data elements may be populated with data from the received account and/or order information. As shown in FIG. 5D for example, the support user conversation interface 501B may display the support user conversation interface elements 501C alongside one another allowing the operator to navigate or toggle between or among two or more support user conversation interface elements 501C. In an example embodiment, when the operator selects a support user conversation interface element 501C, the plurality of support user data elements and the MAISC interfaces will be updated accordingly under control of the MAISC application.

As shown in FIG. 5D, the support user account and order status interface 510B may include account information indicating, for example, the support user's name, the support user's email address, and the support user's segment type, etc. In some example embodiments, the account information may be displayed as read-only fields or editable input fields 501D. For example, the editable input fields 501D may be editable by the operator and thereafter said changes may be saved to a corresponding database of the one or more service applications 120A, 120B, and/or 120C. In another example, the support user account and order status interface 510B may provide the operator means for selecting a particular order associated with the support user. For example the order id field 502D is configured to be displayed as a selection field that once selected, will trigger display of an order selection modal window 503D which is a graphical control element subordinate to the custom interactive support interface 500C. The order selection modal window 503D may include a listing of orders associated with the support user and may be configured to update the support user account and order status interface 510B upon selection of a particular order.

In another example embodiment, the support user account and order status interface 510B may include data fields configured to display hyperlinks to other web documents or links to an informational modal window 505D. The support user account and order status interface 510B may further include copy links configured to "copy" the field contents to the clipboard to be "pasted" into the custom interactive support interface 500C or another computer interface of service application 120A, 120B, 120C, or 125A. For example, the operator may select the permalink field 506D to copy the "power-edge-yoga-fitness" link 507D to be later pasted to the support user communication message content preview interface 506B.

Figure 5E:
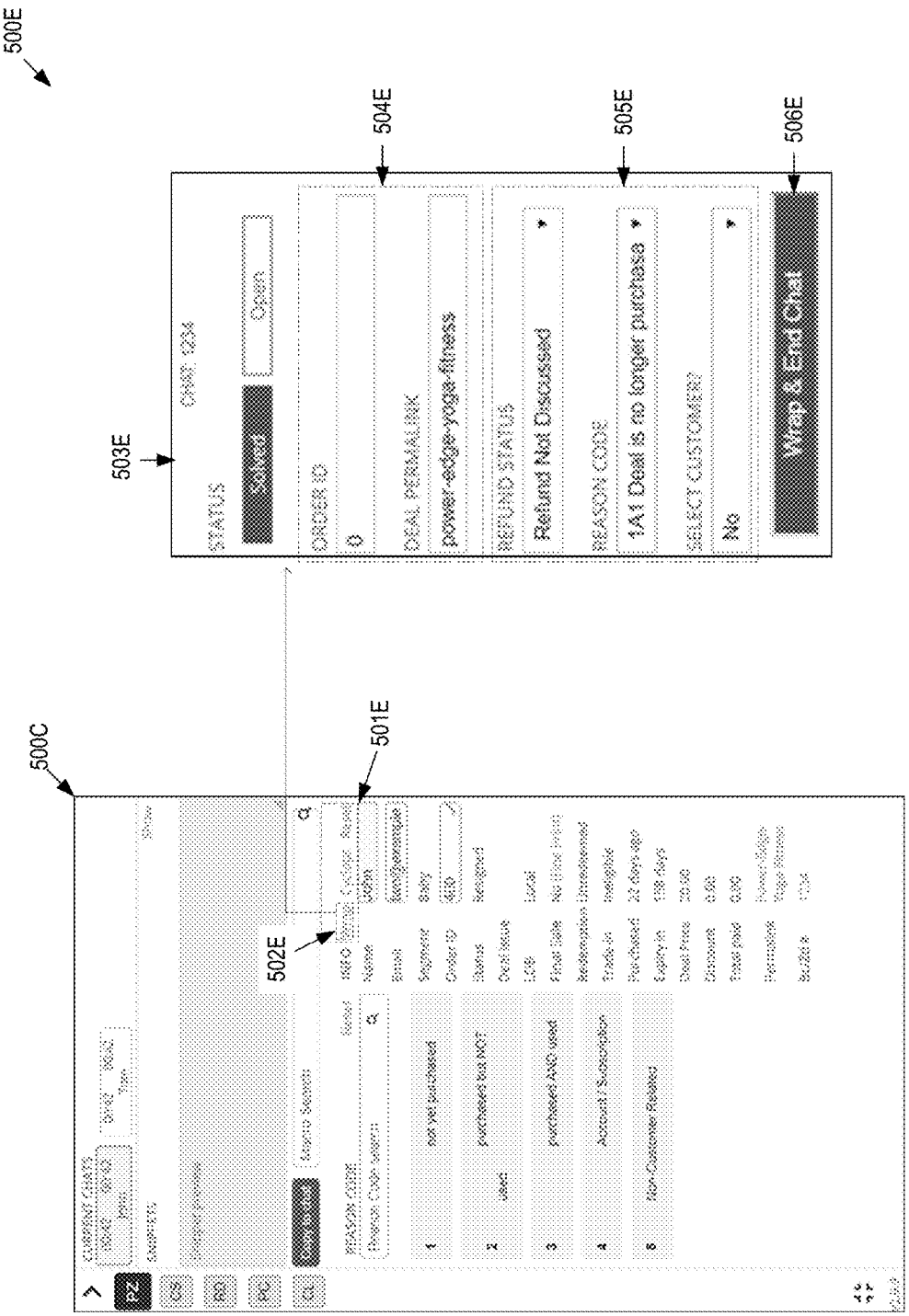

The support user account and order status interface 510B may further include a resolution data record summary interface 503E as depicted by 500E of FIG. 5E. In an example embodiment, the support user account and order status interface 510B includes a one or more support user account and order status action elements 501E. The one or more support user account and order status action elements 501E may include an action to display the resolution data record summary interface 503E as indicated by support user account and order status action element 502E. The one or more support user account and order status action elements 501E may further include actions to invoke a new instance of another web document or a computer interface of a service application (e.g., Cyclops). Another example action provided by the one or more support user account and order status action elements 501E include a reset action to adjust or set again the support user account and order status interface 510B.

The resolution data record summary interface 503E is configured to provide a summary or review of the operational steps, activities, or actions taken to resolve the dynamic support request. The contents captured by the resolution data record summary interface 503E is transmitted to one or more service applications 120A, 120B, and/or 120C so store the resolution data in, for example, a support resolution log of a database that may be later retrieved for analysis and/or inspection. In an example embodiment, the resolution data captured by the resolution data record summary interface 503E may include data prefilled by the MAISC system (e.g., order id and deal permalink) 504E, dropdown fields that are pre-filled by the MAISC system or selected by the operator 505E, etc. The resolution data record summary interface 503E is further configured to transmit the captured data to a corresponding service application as depicted by the resolution data record summary submission interface element 506E. In an example embodiment, the MAISC application transmits a resolution data communication to the one or more service applications.

B. Multi-Sector Graphical Interface Element

An illustration of at least one advantageous embodiment of the multi-sector graphical interface element is illustrated as 600A of FIG. 6A. FIG. 6A includes a custom interactive support interface 601A returned by the MAISC application, the custom interactive support interface 601A comprising a multi-sector graphical interface element 605A. The multi-sector graphical interface element is configured to facilitate operator interaction with multiple service applications. In an example embodiment, the operator may access the multi-sector graphical interface element 605A via selection of the multi-sector graphical interface element tool 604A of the multi-application interactive support and communication selector interface 603A.

The custom interactive support interface 601A also illustrates that the multi-sector graphical interface element 605A comprises a plurality of sector elements that are engageable by the operator via the computer interface (e.g., custom interactive support interface 601A). In an example embodiment, the plurality of sector elements are configured into a support hierarchy based on the dynamic support request. For example, the dynamic support request comprising a support user account identifier and support user issue data may indicate that the support user has a support issue related to a particular order and would like a refund.

In an example embodiment, the MAISC application is configured to receive a sector input selection in response to operator engagement of one of the plurality of sector elements. Upon receiving the sector input selection, the MAISC application is configured to update the plurality of sector elements to display a secondary tier of the support hierarchy in response to the sector input selection. It is understood that virtually any type of information can be listed in the tiers of the support hierarchy corresponding to the types of data the MAISC system is to provide.

FIG. 6A illustrates the MAISC application receiving the sector input selection 606A (e.g., refund/trade in/deny) and in response to the selection, the MAISC application is configured to update the plurality of sector elements to display a secondary tier of the support hierarchy of the multi-sector graphical interface element 607A. The MAISC application may then receive the sector input selection 608A (e.g., within 3 days) and in response to the selection, the MAISC application is configured to update the plurality of sector elements to display a third tier of the support hierarchy of the multi-sector graphical interface element 601B. See FIG. 6B.

In an example embodiment and as shown by 600B of FIG. 6B, the MAISC application may receive the sector input selection 602B of the third tier of the support hierarchy of the multi-sector graphical interface element 601B. Upon receiving this selection, the MAISC application may be configured to trigger execution of a communication macro, wherein the communication macro comprises commands related to inserting predetermined text strings into a support user communication interface 603B. In an example embodiment, the MAISC application is configured to display the predetermined text strings on the support user communication message content preview interface 506B as shown in FIG. 6B. In another example embodiment, the MAISC application may be configured to post or transmit contents of the support user communication message content preview interface 506B into a support user communication interface 603B via a support user communication interface posting element 507B as shown in FIG. 6B. For example, the MAISC application transmits a support user communication 604B to a service application 125A configured to provide the support user communication interface 603B. In this example embodiment, the support user communication interface 603B of the service application 125A is not native to the MAISC application and its interfaces. In other words, the support user communication interface 603B of the service application 125A operates on a compiled code base or repository that is separate and distinct from that which supports the MAISC application and its interface. In another example embodiment, the support user communication interface 603B may be part of an internal service application operating on a same compiled code base or repository as the MAISC application and its interface.

C. Customization of the Multi-Sector Graphical Interface Element

Figure 6C:
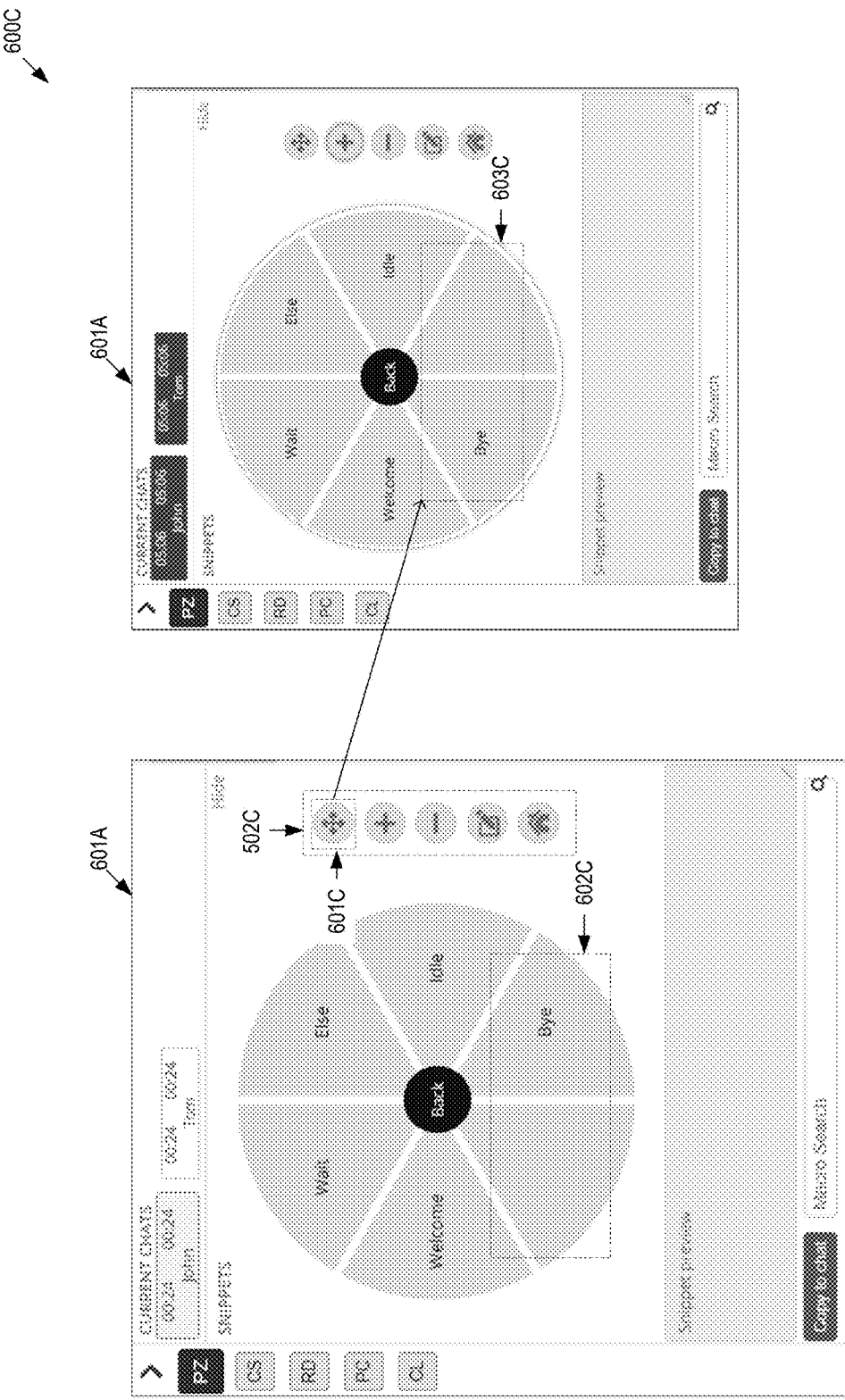

FIGS. 6C-6F illustrate methods of customizing the multi-sector graphical interface element. In particular 600C of FIG. 6C illustrates at least one of the plurality of sector elements is configured, when engaged by the operator, to move from one position to another position of the multi-sector graphical interface element. For example, the operator may select an action to move a sector element 601C from the plurality of multi-sector graphical interface customization elements 502C. Thereafter, the operator indicates a new position of the sector element in the multi-sector graphical interface element and as shown in 600C, the sector element moves from one position 602C to another position 603C.

Figure 6D:
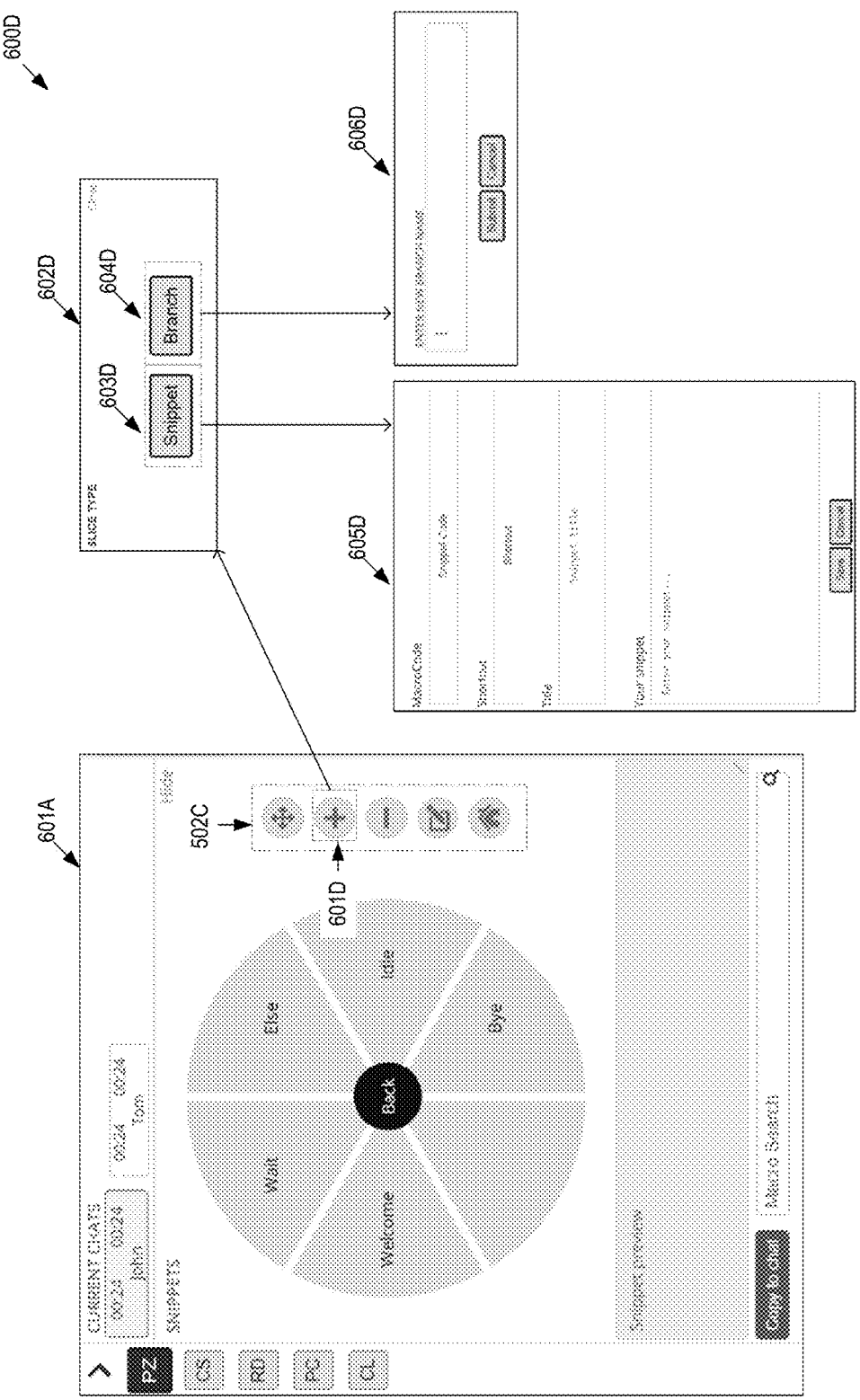
Figure 6E:
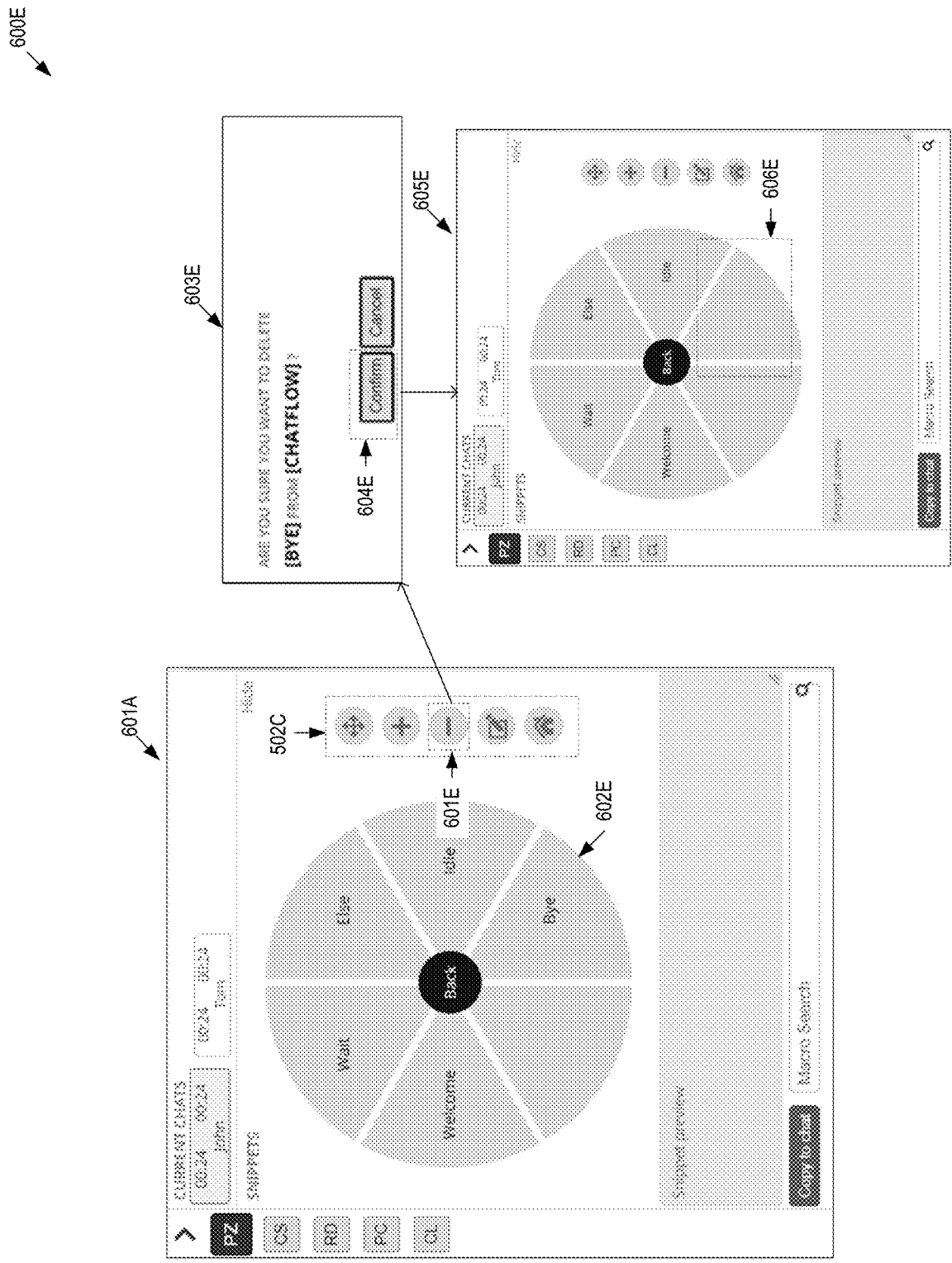

In FIG. 6D, the MAISC application is configured to generate a sector element and update the plurality of sector elements to display the generated sector element. For example, as shown in 600D of FIG. 6D, the operator may select an action to add a new selector element or tier (e.g., branch) 601D to the multi-sector graphical interface element from the plurality of multi-sector graphical interface customization elements 502C. In an example embodiment, the MAISC application may generate for display a sector element type modal window 602D which is configured to generate either a communication macro generation modal window 605D or a tier generation modal window 606D based on the operator selecting respective action elements to generate a communication macro 603D or generate a tier 604D.

In yet another example embodiment, the MAISC application is configured to remove a sector element and update the plurality of sector elements to not display the removed sector element. For example, in FIG. 6E the operator may select an action to remove a sector element 601E from the plurality of multi-sector graphical interface customization elements 502C. Thereafter, the operator selects the sector element to be deleted and as shown in 600E, the MAISC application may generate for display a confirmation deletion modal window 603E requesting confirmation from the operator whether or not the selected sector element should be deleted. Upon selection by the user confirming the deletion action 604E, the MAISC application is configured to delete the selected sector element 602E. The selected sector element 602E is deleted from the multi-sector graphical interface as indicated by 606E.

Figure 6F:
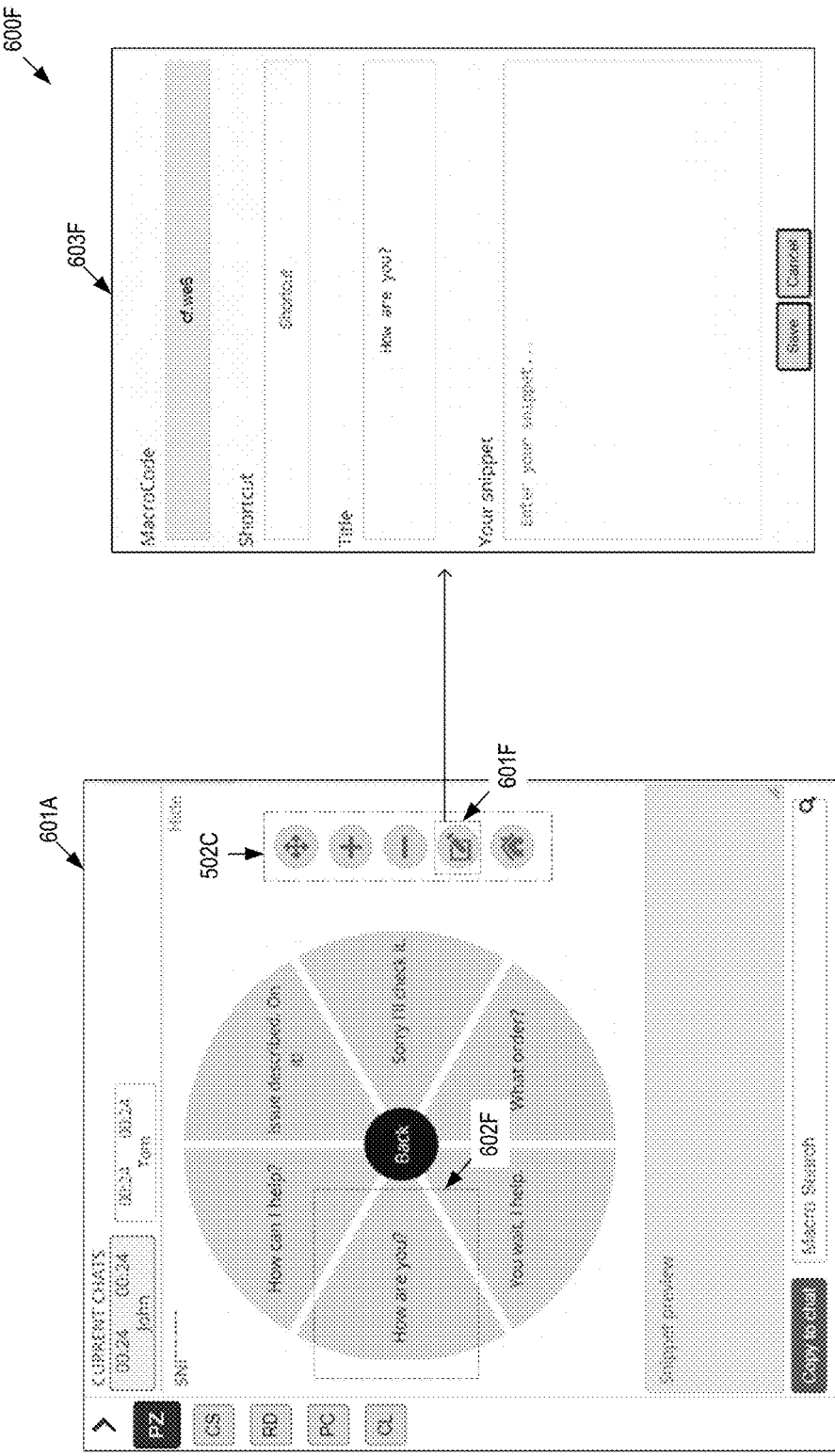

600F of FIG. 6F illustrates editing a selected sector element 602F in response to the operator selecting an action to edit a sector element 601F from the plurality of multi-sector graphical interface customization elements 502C. The MAISC application is configured to trigger the display of a communication macro edit modal window 603F. In an example embodiment, the MAISC application is further configured to receive edits to content in a sector element via the communication macro edit modal window 603F to which the MAISC application is then configured to replace the content in the sector element with the received edits.

D. User Support Decision Tree Interface

FIG. 7A illustrates a user support decision tree interface configured to facilitate traversal of a user support workflow based on operator engagement with the user support decision tree interface 700A. In FIG. 7A, there is shown a user support decision tree interface 509B. The user support decision tree interface 509B comprises a candidate resolution code search 702A, a reset action 701A to adjust or set again the user support decision tree interface 509B, and possible responses to a root node (or root question). It is seen in FIG. 7A that the user support decision tree can go on, as necessary, to a particular field of resolution with further questions resulting from the preceding questions until there are finally resolution actions selected.

For example, if the root question as shown in the user support decision tree interface 509B is to identify the most relevant issues related to the dynamic support request, there would be at least five branches from this request, 1. coupon XYZ not yet purchased; 2. coupon XYZ purchased but not used; 3. coupon XYZ purchased and used; 4. coupon XYZ account/subscription; and 5. non-customer related. See FIG. 7A. Then, when dealing with the branch of the tree for 2. coupon XYZ purchased but not used 703A, the MAISC application will avoid asking the operator whether the coupon XYZ was satisfied with using coupon XYZ, as this is no longer a relevant question, based on the previous answer that coupon XYZ was purchased but not used 703A. For each question in the tree, the simulated cases reflect the answers and significant parameters of all preceding questions along the path from the root question.

In the example 700A, the operator has selected 2. coupon XYZ purchased but not used 703A, and in response the MAISC application is configured to provide a second tier of decision tree branches 704A. Upon selection of 2C trouble redeeming—code issues 705A, the MAISC application is configured to provide a third tier of decision tree branches 706A for selection in the user support decision tree interface 509B. Upon selection of 2C1 email with voucher code or redemption link never received 707A, the MAISC application is configured to present a question with possible decision tree branches (e.g., yes, no) for selection in the user support decision tree interface 708A. The operator may select decision tree branch yes 709A, and in response the MAISC application is configured to provide for display a candidate resolution code 701B. As shown in FIG. 7B, candidate resolution code 701B comprises a macro 702B and a workflow enhance action 703B. 700B of FIG. 7B illustrates subsequent operations invoked upon selection of the macro 702B and the workflow enhance action 703B.

In an example embodiment, the MAISC application is configured to trigger the communication macro 702B, wherein the communication macro 702B comprises commands related to inserting predetermined text strings into support user communication message content preview interface as shown by 704B.

Additionally or alternatively, the MAISC application is configured to trigger the workflow enhance action 703B. In an example embodiment, triggering the workflow enhance action 703B may cause operational steps related to one or more of executing a communication macro, initiating an workflow enhance action to solve the dynamic support request, or editing the communication macro. For example, the workflow enhance action 703B initiates the workflow enhance action to enable trade-in by transmitting a trade-in request signal to one or more application services. In response, the one or more application services provide a response indicating that the trade-in failed.

In another example embodiment, the user support decision tree interface 705B is configured to display another question related to whether or not the issue was resolved. In this example scenario, the operator selects yes 706B. The user support decision tree interface 707B is then configured to display a summary of the user support decision tree questions and answers to the operator for review. In an example embodiment, this resolution data is transmitted via a resolution data communication to one or more applicable applications services.

In another example embodiment and as shown by 700C of FIG. 7C, the MAISC application may be opened and may run concurrently and displayed with another computer interface 701C associated with service application 125B. As discussed above, candidate resolution code 701B comprises a communication macro 702B. In an example embodiment, the MAISC application is configured to trigger a communication macro, wherein the communication macro comprises commands related to inserting predetermined text strings 703C into support user communication interface 702C as shown by FIG. 7C. For example, the MAISC application applies communication macro 702B which transmits a support user communication to service application 125B configured to provide the support user communication interface 702C. In this example embodiment, the support user communication interface 702C of the service application 125B is not native to the MAISC application and its interfaces. In other words, the support user communication interface 702C of the service application 125B operates on a compiled code base or repository that is separate and distinct from that which supports the MAISC application and its interface. In another example embodiment, the support user communication interface 702C may be part of an internal service application operating on a same compiled code base or repository as the MAISC application and its interface.

E. Multi-Application Interactive Support and Communication Selector Interface

In an example embodiment, the MAISC application is further configured to output, to the computer interface, a multi-application interactive support and communication selector interface comprising a plurality of workflow enhance actions at each of the multiple service applications as depicted in FIGS. 8A-8C.

FIG. 8A illustrates operations related to workflow enhance actions for managing the plurality of support user data elements 800A. As shown in FIG. 8A, the MAISC application provides a custom interactive support interface comprising the multi-application interactive support and communication selector interface 502B. In particular, the multi-application interactive support and communication selector interface 502B includes a support user account and order status management interface element tool 802A. In an example embodiment, the operator may access the support user account and order status management interface 801A via selection of the support user account and order status management interface element tool 802A of the multi-application interactive support and communication selector interface 502B. The support user account and order status management interface 801A comprises at least two interfaces: a support user account data management interface 803A and a support user order management interface 804A.

The support user account data management interface 803A comprises a plurality of user data elements. For example, FIG. 8A shows the support user account data management interface 803A comprising the support user's name, the support user's email address, and the support user's segment type which indicates the support user's account level (e.g., regular, VIP, new user, etc.). The support user account data management interface 803A further includes one or more workflow enhance actions related to the support user account data 805A. Workflow enhance actions related to the support user account data 805A can include, without limitation, execution of a communication macro, adding one or more pre-defined text strings or "snippets" to a support user communication, or workflow enhance action to assist an operator to help a support user. For example, the workflow enhance actions related to the support user account data 805A include workflow enhance actions to reset the support's password, unsubscribe the support user from one or more subscriptions, reactivate or deactivate the support user's account, or manage the support user's payment options (e.g., add money or credit the support user's account). In an example embodiment, the operator may select the workflow enhance action to unsubscribe the support user from a mailing list 806A. In response, the MAISC application may be configured to generate for display an unsubscribe confirmation modal window 807A which is a graphical control element subordinate to the support user account and order status management interface

801A. The unsubscribe confirmation modal window 807A may request confirmation from the operator whether or not the support user indeed wants to unsubscribe from the mailing list. Upon selection by the operator confirming the unsubscribe action, the MAISC application is configured to unsubscribe the support user account from the mailing list. In an example embodiment, a service application 120A completes the unsubscribe action. For example, the service application 120A may be a support user account and order management engine service application configured to manage and execute actions related to the support user's account and/or order data. For example, if the service application 120A determines to unsubscribe the support user from the mailing list, a workflow enhance action to assist the operator in unsubscribing the support user may be executed. Such workflow enhance action may further include the generation of a communication macro having predetermined text informing the support user that their issue is resolved (e.g., the support user is unsubscribed from the mailing list).

The support user order management interface 804A comprises a plurality of user data elements related to the support user's order information. For example, FIG. 8A shows the support user order management interface 804A comprising the support user's listing of one or more orders. Each order may include the following data elements: order name, order number, purchase date, expiration date, redemption date quantity, price, net price, and order status. The support user order management interface 804A further includes one or more workflow enhance actions related to the support user order data 808A. Workflow enhance actions related to the support user order data 808A can include, without limitation, execution of a communication macro, adding one or more pre-defined text strings or "snippets" to a support user communication, or workflow enhance action to assist an operator to help a support user. For example, the workflow enhance actions related to the support user order data 808A include workflow enhance actions to redeem and order, provide a refund, or provide a trade-in. In an example embodiment, the operator may select the workflow enhance action to provide a refund 809A. In response, the MAISC application may be configured to generate for display refund modal window 810A which is a graphical control element subordinate to the support user account and order status management interface 801A. The refund modal window 810A may request selection from the operator of the particular order to be refunded and to what instrument the refund should apply such as for example, the support user's original payment method (e.g., credit card, gift card voucher, etc.) or the support user's account credit. Upon selection by the operator confirming the refund action, the MAISC application is configured to refund the support user account. In an example embodiment, a service application 120A completes the refund action. For example, the service application 120A may be a support user account and order management engine service application configured to manage and execute actions related to the support user's account and/or order data. For example, if the service application 120A determines to refund the support user, a workflow enhance action to assist the operator in refunding the support user may be executed. Such workflow enhance action may further include the generation of a communication macro having predetermined text informing the support user that their issue is resolved (e.g., a refund has been issued to the support user's original payment method).

FIG. 8B illustrates operations related to workflow enhance actions for managing value added services 800B. As shown in FIG. 8B, the MAISC application provides a custom interactive support interface comprising the multi-application interactive support and communication selector interface 502B. In particular, the multi-application interactive support and communication selector interface 502B includes a support user order promotion management interface element tool 801B. In an example embodiment, the operator may access the order promotion management interface 808B via selection of the support user order promotion management interface element tool 801B of the multi-application interactive support and communication selector interface 502B. As shown in FIG. 8B, the support user order promotion management interface element tool 801B comprises data related to deal recommendations based on the support user account identifier. The operator may view a listing of deal recommendations 802B and a listing of the most recently viewed deals 804B by the support user associated with the support user account identifier. As shown in FIG. 8B, included in the most recently viewed deals 804B is an input element for a universal resource locator (URL) of an alternate deal 805B, i.e., an alternate deal permalink, for displaying information on a deal recommendation selected by the operator. In an example embodiment, the operator may view a particular deal recommendation from the listing of deal recommendations 802B and select a workflow enhance action to accept the deal recommendation, defer the deal recommendation, or reject the deal recommendation as shown by 803B. In response to a selection of one of the workflow enhance actions, the MAISC application may be configured to transmit a signal to a service application 120A to complete the workflow enhance action (e.g., accept deal recommendation ABC for support user account identifier 007).

FIG. 8B further illustrates the multi-application interactive support and communication selector interface 502B comprising a support user order eligible promotion interface element tool 806B. In an example embodiment, the operator may access an order eligible promotion interface 807B via selection of the support user order eligible promotion interface element tool 806B of the multi-application interactive support and communication selector interface 502B. As shown in FIG. 8B, the order eligible promotion interface 807B comprises eligible promotions that may include rewards, discounts, coupons, credits, deals, incentives, discounts, or the like that is indicative of a promotional value or the like that upon purchase or acceptance results in the issuance of an instrument that may be used toward at least a portion of the purchase of particular goods, services and/or experiences defined by the promotion. A list of eligible promotions shown in the order eligible promotion interface 807B is based on at least the support user account identifier.

FIG. 8C illustrates operations related to workflow enhance actions for managing a plurality of communication macros associated with the operator. In this example embodiment, the MAISC application provides an order status management interface 801A comprising the multi-application interactive support and communication selector interface 502B. In particular, the multi-application interactive support and communication selector interface 502B includes a communication macro management interface element tool 801C. In an example embodiment, the operator may retrieve a listing of their saved communication macros in response to selection of the communication macro management interface element tool 801C. The list of saved communication macros are displayed in a communication macro management interface 802C as shown in FIG. 8C. The communication macro management interface 802C comprises the list of saved communication macros, wherein each communication macro of the list includes the following data elements: a communication macro code, a communication macro shortcut, and a communication macro title. In an example embodiment, the communication macro shortcut is configured as a text expander. In an example embodiment, the communication macro shortcut begins with a predetermined special character (e.g., "." or "/") and is followed by one word (e.g., ".wait" or "/wait") as shown in the displayed communication macro edit modal window 603F. For example, if the operator types the shortcut/wait in the support user communication message content preview interface 506B of FIG. 6B, the MAISC application is configured to perform a preprogrammed action to replace the/wait inputted text with the predetermined text "Please hold for a minute, while I check this for you," as illustrated in the communication macro edit modal window 603F. In this example embodiment, the communication macro edit modal window is caused to be displayed in response to an edit action 803C.

In yet another example embodiment, the communication macro management interface 802C further provides a remove action 805C configured to trigger the display of a confirmation deletion modal window 806C requesting confirmation from the operator whether or not the selected communication macro should be deleted. Upon selection by the user confirming the deletion action, the MAISC application is configured to delete the selected communication macro. The selected communication macro is deleted from the communication macro management interface 802C.

Exemplary Processes for Facilitating Operator Communications with Support Users

FIG. 9 shows an exemplary flowchart that embodies a computer implemented method for outputting, to a computer interface, the MAISC interface. The computer implemented method begins with step 900, where the MAISC application receives a dynamic support request, the dynamic support request comprising a support user account identifier and support user issue data.

For example, an operator establishes a connection to a service application 125A providing a chat service. Once a connection to the service application 125A has been established, the service application 125A may directly or indirectly transmit data comprising an account identifier associated with the support user and support user issue data associated with the support user to the MAISC application. In receiving the dynamic support request, the MAISC application may provide the operator with a support user conversation element associated with a chat session to manage the dynamic support request.

As shown in step 902, the MAISC application is then configured to output, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications. For example, the plurality of support user data elements may include information such as a support user's name, street address, identification number, order history, and information regarding services and products purchased or subscribed to by the support user.

According to an example embodiment, the MAISC application obtains the plurality of support user data elements from one or more service applications 120A, 120B, and/or 120C. For example, service application 120A may be associated with an order system comprising information related to order information. In another example, service application 120B may be associated with a promotion and deal system information on recommended deals for support users. In another example embodiment, each of the multiple service applications is one of: an external service application to the multi-application interactive support and communication system, or an internal service application to the multi-application interactive support and communication system, wherein an external service application operates on a compiled code base or repository that is separate and distinct from that which supports the multi-application interactive support and communication system and an internal service application operates on a same compiled code base or repository as the multi-application interactive support and communication system.

In step 904, the MAISC application is then configured to update the plurality of support user data elements of the multi-application interactive support and communication interface based on the support user contextual data. In another example embodiment, support user account identifier and an order identifier of the support user issue data are utilized to retrieve support user context data. In an example embodiment, the multi-sector graphical interface element comprises a plurality of sector elements that are engageable by the operator via the computer interface. The plurality of sector elements are configured into a support hierarchy based on the dynamic support request. The MAISC application is then further configured to receive a sector input selection in response to operator engagement of one of the plurality of sector elements and update the plurality of sector elements to display a secondary tier of the support hierarchy in response to the sector input selection.

In an example embodiment, at least one of the updated plurality of sector elements displaying the secondary tier of the support hierarchy is configured, when engaged by the operator, to trigger execution of a communication macro, wherein the communication macro comprises commands related to inserting predetermined text strings into a support user communication interface. The MAISC application is further configured to output, to the computer interface, a user support decision tree interface that is configured along a user support workflow based on the dynamic support request. The user support decision tree interface is configured to facilitate traversal of the user support workflow based on operator engagement with the user support decision tree interface.

In an example embodiment, the user support decision tree interface is output to the computer interface proximate the multi-sector graphical interface element. For example, the user support decision tree interface represents a series of information requests presented to the operator as part of a decision making session, and presenting the information requests to the operator in a sequence provided by a decision tree. Decision trees can be used to derive easily interpretable and intuitive rules for decision support systems. Information is received from the operator in response to at least some of the presented information requests. The operator provides information in response to an information request. It is then determined whether the information received from the operator results in a change to the decision tree, and the decision tree is modified based on the information.

The user support decision tree interface is further configured to facilitate identification of one or more candidate resolution codes associated with the dynamic support request. To this end, the user support decision tree interface is used by the operator to identify the one or more candidate resolution codes that may cause execution of a resolution to a support issue associated with a dynamic support request. Additionally or alternatively, the MAISC application is further configured to output an issue resolution communication selected based on the one or more candidate resolution codes to a user device associated with the dynamic support request. In an example embodiment, the MAISC application is further configured to output, to the computer interface, a multi-application interactive support and communication selector interface comprising a plurality of workflow enhance actions at each of the multiple service applications.

The plurality of workflow enhance actions comprises operational steps related to one or more of executing a communication macro, initiating an workflow enhance action to solve the dynamic support request, or editing the communication macro. In an example embodiment, the multi-application interactive support and communication selector interface is configured to facilitate performance of one or more workflow enhance actions on each of the multiple service applications responsive to receiving the operator interaction with the multi-application interactive support and communication selector interface.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general-purpose computer, special purpose computer, or other programmable data processing apparatus, such as processor 210 and/or MAISC application logic 224 as discussed above, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., the memory 212) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for operating a multi-application interactive support and communication interface of a multi-application interactive support and communication system, the apparatus comprising at least one processor, and at least one memory having computer coded instructions therein, with the computer instructions configured to, when executed by the processor, cause the apparatus to:
   receive a dynamic support request, the dynamic support request comprising a support user account identifier and support user issue data;
   output, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications;
   transmit a request to the multiple service applications requesting account and order information associated with the support user account identifier and the support user issue data;
   receive from the multiple service applications the requested account and order information;
   populate the plurality of support user data elements of the multi-application interactive support and communication interface with data from the requested account and order information; and
   responsive to receiving operator interaction with the multi-application interactive support and communication interface comprising changes to the data of the plurality of support user data elements, communicate the changed data to the multiple service applications.

2. The apparatus of claim 1, wherein at least one of the updated plurality of sector elements displaying the secondary tier of the support hierarchy is configured, when engaged by the operator, to trigger execution of a communication macro, wherein the communication macro comprises commands related to inserting predetermined text strings into a support user communication interface.

3. The apparatus of claim 1, wherein at least one of the plurality of sector elements is configured, when engaged by the operator, to move from one position to another position of the multi-sector graphical interface element.

4. The apparatus of claim 1, wherein the at least one memory and the computer instructions are configured to, when executed by the processor, cause the apparatus to further:
   generate a sector element; and
   update the plurality of sector elements to display the generated sector element.

5. The apparatus of claim 1, wherein the at least one memory and the computer instructions are configured to, when executed by the processor, cause the apparatus to further:
   remove a sector element; and update the plurality of sector elements to not display the removed sector element.

6. The apparatus of claim 1, wherein the at least one memory and the computer instructions are configured to, when executed by the processor, cause the apparatus to further:
receive edits to content in a sector element; and
replace the content in the sector element with the received edits.

7. The apparatus of claim 1, wherein the at least one memory and the computer instructions are configured to, when executed by the processor, cause the apparatus to further:
output, to the computer interface, a user support decision tree interface that is configured along a user support workflow based on the dynamic support request.

8. The apparatus of claim 7, wherein the user support decision tree interface is configured to facilitate traversal of the user support workflow based on operator engagement with the user support decision tree interface.

9. The apparatus of claim 7, wherein the user support decision tree interface is output to the computer interface proximate the multi-application interactive support and communication interface.

10. The apparatus of claim 7, wherein the user support decision tree interface is configured to facilitate identification of one or more recommended resolution codes associated with the dynamic support request.

11. The apparatus of claim 10, wherein facilitating identification of one or more recommended resolution codes associated with the dynamic support request further causes the at least one memory and the computer instructions to, when executed by the processor, cause the apparatus to further:
parse the support user issue data associated with the dynamic support request;
search the user support workflow for a plurality of candidate resolution codes; and
score the plurality of candidate resolution codes based on a determined likeliness to solve a support issue associated with the dynamic support request.

12. The apparatus of claim 10, wherein the at least one memory and the computer instructions are configured to, when executed by the processor, cause the apparatus to further:
output an issue resolution communication selected based on the one or more recommended resolution codes to a user device associated with the dynamic support request.

13. The apparatus of claim 1, wherein the at least one memory and the computer instructions are configured to, when executed by the processor, cause the apparatus to further:
output, to the computer interface, a multi-application interactive support and communication selector interface comprising a plurality of workflow enhance actions at each of the multiple service applications.

14. The apparatus of claim 13, wherein the plurality of workflow enhance actions comprises operational steps related to one or more of executing a communication macro, initiating a workflow enhance action to solve the dynamic support request, or editing the communication macro.

15. The apparatus of claim 14, wherein the multi-application interactive support and communication selector interface is configured to facilitate performance of one or more workflow enhance actions on each of the multiple service applications responsive to receiving the operator interaction with the multi-application interactive support and communication selector interface.

16. The apparatus of claim 15, wherein each of the multiple service applications is one of:
an external service application to the multi-application interactive support and communication system, or an internal service application to the multi-application interactive support and communication system,
wherein the external service application operates on a compiled code base or repository that is separate and distinct from that which supports the multi-application interactive support and communication system and the internal service application operates on a same compiled code base or repository as the multi-application interactive support and communication system.

17. The apparatus of claim 1, wherein the multi-sector graphical interface element is arranged as a pie-graph comprising the plurality of sector elements.

18. A computer-implemented method for operating a multi-application interactive support and communication interface of a multi-application interactive support and communication system, the computer-implemented method comprising:
receiving a dynamic support request, the dynamic support request comprising a support user account identifier and support user issue data;
outputting, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications;
transmitting a request to the multiple service applications requesting account and order information associated with the support user account identifier and the support user issue data;
receiving from the multiple service applications the requested account and order information;
populating the plurality of support user data elements of the multi-application interactive support and communication interface with data from the requested account and order information; and
responsive to receiving operator interaction with the multi-application interactive support and communication interface comprising changes to the data of the plurality of support user data elements, communicating the changed data to the multiple service applications.

19. The computer-implemented method of claim 18, wherein at least one of the updated plurality of sector elements displaying the secondary tier of the support hierarchy is configured, when engaged by the operator, to trigger execution of a communication macro, wherein the communication macro comprises commands related to inserting predetermined text strings into a support user communication interface.

20. The computer-implemented method of claim 18 further comprising:
outputting, to the computer interface, a user support decision tree interface that is configured along a user support workflow based on the dynamic support request.

21. The computer-implemented method of claim 18, wherein the multi-sector graphical interface element is arranged as a pie-graph comprising the plurality of sector elements.

22. A computer program product, stored on a computer readable medium, comprising instructions that when executed on one or more computers cause the one or more computers to perform operations comprising:

receiving a dynamic support request, the dynamic support request comprising a support user account identifier and support user issue data;

outputting, to a computer interface, the multi-application interactive support and communication interface, the multi-application interactive support and communication interface comprising a plurality of support user data elements and a multi-sector graphical interface element, wherein the multi-sector graphical interface element is configured to facilitate operator interaction with multiple service applications;

transmitting a request to the multiple service applications requesting account and order information associated with the support user account identifier and the support user issue data;

receiving from the multiple service applications the requested account and order information;

populating the plurality of support user data elements of the multi-application interactive support and communication interface with data from the requested account and order information; and responsive to receiving operator interaction with the multi-application interactive support and communication interface comprising changes to the data of the plurality of support user data elements, communicating the changed data to the multiple service applications.

23. The computer program product of claim 22, wherein at least one of the updated plurality of sector elements displaying the secondary tier of the support hierarchy is configured, when engaged by the operator, to trigger execution of a communication macro, wherein the communication macro comprises commands related to inserting predetermined text strings into a support user communication interface.

24. The computer program product of claim 22 further comprising:

outputting, to the computer interface, a user support decision tree interface that is configured along a user support workflow based on the dynamic support request.

25. The computer program product of claim 22, wherein the multi-sector graphical interface element is arranged as a pie-graph comprising the plurality of sector elements.

* * * * *